(12) United States Patent
Garcia et al.

(10) Patent No.: US 7,945,424 B2
(45) Date of Patent: May 17, 2011

(54) DISK DRIVE EMULATOR AND METHOD OF USE THEREOF

(75) Inventors: Edward Garcia, Holbrook, MA (US); Michael L. Ardai, Malden, MA (US)

(73) Assignee: Teradyne, Inc., North Reading, MA (US)

( * ) Notice: Subject to any disclaimer, the term of this patent is extended or adjusted under 35 U.S.C. 154(b) by 599 days.

(21) Appl. No.: 12/104,594

(22) Filed: Apr. 17, 2008

(65) Prior Publication Data

US 2009/0265136 A1    Oct. 22, 2009

(51) Int. Cl.
*G06F 15/00* (2006.01)
(52) U.S. Cl. ........................................ 702/183
(58) Field of Classification Search .............. 702/183, 702/117, 118
See application file for complete search history.

(56) References Cited

U.S. PATENT DOCUMENTS

| | | |
|---|---|---|
| 557,186 A | 3/1896 | Cahill |
| 2,224,407 A | 12/1940 | Passur |
| 2,380,026 A | 7/1945 | Clarke |
| 2,631,775 A | 3/1953 | Gordon |
| 2,635,524 A | 4/1953 | Jenkins |
| 3,120,166 A | 2/1964 | Lyman ............................. 98/39 |
| 3,360,032 A | 12/1967 | Sherwood |
| 3,364,838 A | 1/1968 | Bradley |
| 3,517,601 A | 6/1970 | Courchesne |
| 3,845,286 A | 10/1974 | Aronstein et al. |
| 4,147,299 A | 4/1979 | Freeman |
| 4,233,644 A | 11/1980 | Hwang et al. .................. 361/384 |
| 4,336,748 A | 6/1982 | Martin et al. ..................... 98/33 |
| 4,379,259 A | 4/1983 | Varadi et al. ..................... 324/73 |
| 4,477,127 A | 10/1984 | Kume ................................ 312/8 |
| 4,495,545 A | 1/1985 | Dufresne et al. .............. 361/384 |
| 4,526,318 A | 7/1985 | Fleming et al. ................. 236/49 |
| 4,620,248 A | 10/1986 | Gitzendanner |
| 4,648,007 A | 3/1987 | Garner ........................... 361/384 |
| 4,654,732 A | 3/1987 | Mesher |
| 4,665,455 A | 5/1987 | Mesher |
| 4,683,424 A | 7/1987 | Cutright et al. |
| 4,685,303 A | 8/1987 | Branc et al. ........................ 62/3 |

(Continued)

FOREIGN PATENT DOCUMENTS

AU            583716          5/1989

(Continued)

OTHER PUBLICATIONS

Bakken et al., "Low Cost, Rack Mounted, Direct Access Disk Storage Device", www.ip.com, 4 pages, Mar. 3, 2005.

(Continued)

*Primary Examiner* — Drew A Dunn
*Assistant Examiner* — Stephen J Cherry
(74) *Attorney, Agent, or Firm* — Fish & Richardson P.C.

(57) ABSTRACT

A disk drive emulator for testing a test slot of a disk drive testing system includes an emulator housing, a testing circuit housed in the emulator housing, and an interface connector disposed on the emulator housing and in electrical communication with the testing circuit. The disk drive emulator includes at least one sensor in electrical communication with the testing circuit. The at least one sensor is selected from the group consisting of a temperature sensor, a vibration sensor, and a humidity sensor. The testing circuit is configured to test power delivery of the test slot to the disk drive emulator, monitor the at least one sensor, and monitor connector resistance between the test slot and the disk drive emulator.

19 Claims, 6 Drawing Sheets

U.S. PATENT DOCUMENTS

| | | | |
|---|---|---|---|
| 4,688,124 A | 8/1987 | Scribner et al. | |
| 4,713,714 A | 12/1987 | Gatti et al. | 360/137 |
| 4,739,444 A | 4/1988 | Zushi et al. | 361/383 |
| 4,754,397 A | 6/1988 | Varaiya et al. | 364/200 |
| 4,768,285 A | 9/1988 | Woodman, Jr. | |
| 4,778,063 A | 10/1988 | Ueberreiter | |
| 4,801,234 A | 1/1989 | Cedrone | |
| 4,809,881 A | 3/1989 | Becker | |
| 4,817,273 A | 4/1989 | Lape et al. | |
| 4,817,934 A | 4/1989 | McCormick et al. | |
| 4,851,965 A | 7/1989 | Gabuzda et al. | 361/383 |
| 4,881,591 A | 11/1989 | Rignall | 165/26 |
| 4,888,549 A | 12/1989 | Wilson et al. | 324/73 R |
| 4,911,281 A | 3/1990 | Jenkner | |
| 4,967,155 A | 10/1990 | Magnuson | 324/212 |
| 5,012,187 A | 4/1991 | Littlebury | 324/158 |
| 5,045,960 A | 9/1991 | Eding | |
| 5,061,630 A | 10/1991 | Knopf et al. | 435/290 |
| 5,119,270 A | 6/1992 | Bolton et al. | 361/384 |
| 5,122,914 A | 6/1992 | Hanson | 360/98.01 |
| 5,127,684 A | 7/1992 | Klotz et al. | 292/113 |
| 5,128,813 A | 7/1992 | Lee | |
| 5,136,395 A | 8/1992 | Ishii et al. | |
| 5,158,132 A | 10/1992 | Guillemot | 165/30 |
| 5,168,424 A | 12/1992 | Bolton et al. | 361/384 |
| 5,171,183 A | 12/1992 | Pollard et al. | 454/184 |
| 5,173,819 A | 12/1992 | Takahashi et al. | 360/97.03 |
| 5,176,202 A | 1/1993 | Richard | 165/48.1 |
| 5,205,132 A | 4/1993 | Fu | |
| 5,206,772 A | 4/1993 | Hirano et al. | |
| 5,207,613 A | 5/1993 | Ferchau et al. | 454/184 |
| 5,210,680 A | 5/1993 | Scheibler | 361/384 |
| 5,237,484 A | 8/1993 | Ferchau et al. | 361/689 |
| 5,263,537 A | 11/1993 | Plucinski et al. | 165/97 |
| 5,269,698 A | 12/1993 | Singer | 439/157 |
| 5,295,392 A | 3/1994 | Hensel et al. | |
| 5,309,323 A | 5/1994 | Gray et al. | 361/726 |
| 5,325,263 A | 6/1994 | Singer et al. | 361/683 |
| 5,349,486 A | 9/1994 | Sugimoto et al. | 360/97.01 |
| 5,368,072 A | 11/1994 | Cote | 137/872 |
| 5,374,395 A | 12/1994 | Robinson et al. | |
| 5,379,229 A | 1/1995 | Parsons et al. | |
| 5,398,058 A | 3/1995 | Hattori | |
| 5,412,534 A | 5/1995 | Cutts et al. | 361/695 |
| 5,414,591 A | 5/1995 | Kimura et al. | 361/695 |
| 5,426,581 A | 6/1995 | Kishi et al. | |
| 5,469,037 A | 11/1995 | McMurtrey, Sr. et al. | 318/626 |
| 5,477,416 A | 12/1995 | Schkrohowsky et al. | 361/695 |
| 5,484,012 A | 1/1996 | Hiratsuka | 165/40 |
| 5,486,681 A | 1/1996 | Dagnac et al. | |
| 5,491,610 A | 2/1996 | Mok et al. | 361/695 |
| 5,543,727 A | 8/1996 | Bushard et al. | |
| 5,546,250 A | 8/1996 | Diel | 360/97.02 |
| 5,557,186 A | 9/1996 | McMurtrey, Sr. et al. | 318/626 |
| 5,563,768 A | 10/1996 | Perdue | 361/695 |
| 5,570,740 A | 11/1996 | Flores et al. | |
| 5,593,380 A | 1/1997 | Bittikofer | |
| 5,601,141 A | 2/1997 | Gordon et al. | 165/263 |
| 5,604,662 A | 2/1997 | Anderson et al. | 361/685 |
| 5,610,893 A | 3/1997 | Soga et al. | 369/84 |
| 5,617,430 A | 4/1997 | Angelotti et al. | |
| 5,644,705 A | 7/1997 | Stanley | 395/183.18 |
| 5,646,918 A | 7/1997 | Dimitri et al. | |
| 5,654,846 A | 8/1997 | Wicks et al. | 360/97.01 |
| 5,673,029 A | 9/1997 | Behl et al. | 340/635 |
| 5,694,290 A | 12/1997 | Chang | 361/685 |
| 5,718,627 A | 2/1998 | Wicks | 454/68 |
| 5,718,628 A | 2/1998 | Nakazato et al. | 454/184 |
| 5,731,928 A | 3/1998 | Jabbari et al. | |
| 5,751,549 A | 5/1998 | Eberhardt et al. | 361/687 |
| 5,754,365 A | 5/1998 | Beck et al. | |
| 5,761,032 A | 6/1998 | Jones | 361/685 |
| 5,793,610 A | 8/1998 | Schmitt et al. | 361/695 |
| 5,811,678 A | 9/1998 | Hirano | 73/461 |
| 5,812,761 A | 9/1998 | Seki et al. | 395/185.07 |
| 5,819,842 A | 10/1998 | Potter et al. | 165/206 |
| 5,831,525 A | 11/1998 | Harvey | 340/507 |
| 5,851,143 A | 12/1998 | Hamid | 454/57 |
| 5,859,409 A | 1/1999 | Kim et al. | 219/400 |
| 5,859,540 A | 1/1999 | Fukumoto | 324/760 |
| 5,862,037 A | 1/1999 | Behl | 361/687 |
| 5,870,630 A | 2/1999 | Reasoner et al. | 395/894 |
| 5,886,639 A | 3/1999 | Behl et al. | 340/635 |
| 5,890,959 A | 4/1999 | Pettit et al. | 454/184 |
| 5,912,799 A | 6/1999 | Grouell et al. | 361/685 |
| 5,913,926 A | 6/1999 | Anderson et al. | 714/6 |
| 5,914,856 A | 6/1999 | Morton et al. | 361/690 |
| 5,927,386 A | 7/1999 | Lin | 165/80.3 |
| 5,956,301 A | 9/1999 | Dimitri et al. | |
| 5,959,834 A | 9/1999 | Chang | 361/685 |
| 5,999,356 A | 12/1999 | Dimitri et al. | 360/71 |
| 5,999,365 A | 12/1999 | Hasegawa et al. | 360/97.02 |
| 6,000,623 A | 12/1999 | Blatti et al. | 236/49.3 |
| 6,005,404 A | 12/1999 | Cochran et al. | 324/760 |
| 6,005,770 A | 12/1999 | Schmitt | 361/695 |
| 6,008,636 A | 12/1999 | Miller et al. | |
| 6,008,984 A | 12/1999 | Cunningham et al. | 361/685 |
| 6,011,689 A | 1/2000 | Wrycraft | 361/695 |
| 6,031,717 A | 2/2000 | Baddour et al. | 361/687 |
| 6,034,870 A | 3/2000 | Osborn et al. | 361/690 |
| 6,042,348 A | 3/2000 | Aakalu et al. | 417/423.5 |
| 6,045,113 A | 4/2000 | Itakura | |
| 6,055,814 A | 5/2000 | Song | |
| 6,066,822 A | 5/2000 | Nemoto et al. | |
| 6,067,225 A | 5/2000 | Reznikov et al. | 361/685 |
| 6,069,792 A | 5/2000 | Nelik | 361/687 |
| 6,084,768 A | 7/2000 | Bolognia | 361/685 |
| 6,094,342 A | 7/2000 | Dague et al. | 361/685 |
| 6,104,607 A | 8/2000 | Behl | 361/687 |
| 6,115,250 A | 9/2000 | Schmitt | 361/695 |
| 6,122,131 A | 9/2000 | Jeppson | |
| 6,122,232 A | 9/2000 | Schell et al. | |
| 6,124,707 A | 9/2000 | Kim et al. | 324/158.1 |
| 6,130,817 A | 10/2000 | Flotho et al. | 361/685 |
| 6,144,553 A | 11/2000 | Hileman et al. | 361/687 |
| 6,166,901 A | 12/2000 | Gamble et al. | 361/685 |
| 6,169,413 B1 | 1/2001 | Pack et al. | 324/760 |
| 6,169,930 B1 | 1/2001 | Blachek et al. | |
| 6,177,805 B1 | 1/2001 | Pih | 324/754 |
| 6,178,835 B1 | 1/2001 | Orriss et al. | 73/865.9 |
| 6,181,557 B1 | 1/2001 | Gatti | 361/695 |
| 6,185,065 B1 | 2/2001 | Hasegawa et al. | 360/97.02 |
| 6,185,097 B1 | 2/2001 | Behl | 361/695 |
| 6,188,191 B1 | 2/2001 | Frees et al. | |
| 6,192,282 B1 | 2/2001 | Smith et al. | |
| 6,193,339 B1 | 2/2001 | Behl et al. | 312/223.2 |
| 6,209,842 B1 | 4/2001 | Anderson et al. | 248/560 |
| 6,227,516 B1 | 5/2001 | Webster, Jr. et al. | 248/694 |
| 6,229,275 B1 | 5/2001 | Yamamoto | |
| 6,231,145 B1 | 5/2001 | Liu | 312/332.1 |
| 6,233,148 B1 | 5/2001 | Shen | |
| 6,236,563 B1 | 5/2001 | Buican et al. | 361/685 |
| 6,247,944 B1 | 6/2001 | Bolognia et al. | 439/157 |
| 6,249,824 B1 | 6/2001 | Henrichs | |
| 6,252,769 B1 | 6/2001 | Tullstedt et al. | 361/694 |
| 6,262,863 B1 | 7/2001 | Ostwald et al. | |
| 6,272,007 B1 | 8/2001 | Kitlas et al. | |
| 6,272,767 B1 | 8/2001 | Botruff et al. | |
| 6,281,677 B1 | 8/2001 | Cosci et al. | 324/212 |
| 6,282,501 B1 | 8/2001 | Assouad | 702/117 |
| 6,285,524 B1 | 9/2001 | Boigenzahn et al. | |
| 6,289,678 B1 | 9/2001 | Pandolfi | 62/3.2 |
| 6,297,950 B1 | 10/2001 | Erwin | 361/685 |
| 6,298,672 B1 | 10/2001 | Valicoff, Jr. | |
| 6,302,714 B1 | 10/2001 | Bolognia et al. | 439/157 |
| 6,304,839 B1 | 10/2001 | Ho et al. | 703/18 |
| 6,307,386 B1 | 10/2001 | Fowler et al. | |
| 6,327,150 B1 | 12/2001 | Levy et al. | 361/724 |
| 6,330,154 B1 | 12/2001 | Fryers et al. | 361/695 |
| 6,351,379 B1 | 2/2002 | Cheng | 361/685 |
| 6,354,792 B1 | 3/2002 | Kobayashi et al. | |
| 6,356,409 B1 | 3/2002 | Price et al. | 360/98.07 |
| 6,356,415 B1 | 3/2002 | Kabasawa | 360/256.3 |
| 6,384,995 B1 | 5/2002 | Smith | 360/31 |
| 6,388,437 B1 | 5/2002 | Wolski et al. | |
| 6,388,875 B1 | 5/2002 | Chen | 361/685 |
| 6,388,878 B1 | 5/2002 | Chang | 361/687 |

| Patent | Date | Inventor | Class |
|---|---|---|---|
| 6,389,225 B1 | 5/2002 | Malinoski et al. | 392/479 |
| 6,411,584 B2 | 6/2002 | Davis et al. | |
| 6,421,236 B1 | 7/2002 | Montoya et al. | 361/685 |
| 6,434,000 B1 | 8/2002 | Pandolfi | 361/685 |
| 6,434,498 B1 | 8/2002 | Ulrich et al. | 702/115 |
| 6,434,499 B1 | 8/2002 | Ulrich et al. | 702/115 |
| 6,464,080 B1 | 10/2002 | Morris et al. | 306/591 |
| 6,467,153 B2 | 10/2002 | Butts et al. | 29/603.03 |
| 6,473,297 B1 | 10/2002 | Behl et al. | 361/685 |
| 6,473,301 B1 | 10/2002 | Levy et al. | 361/685 |
| 6,476,627 B1 | 11/2002 | Pelissier et al. | 324/760 |
| 6,477,044 B2 | 11/2002 | Foley et al. | |
| 6,477,442 B1 | 11/2002 | Valerino, Sr. | |
| 6,480,380 B1 | 11/2002 | French et al. | 361/690 |
| 6,480,382 B2 | 11/2002 | Cheng | 361/695 |
| 6,487,071 B1 | 11/2002 | Tata et al. | 361/685 |
| 6,489,793 B2 | 12/2002 | Jones et al. | 324/760 |
| 6,494,663 B2 | 12/2002 | Ostwald et al. | |
| 6,525,933 B2 | 2/2003 | Eland | 361/686 |
| 6,526,841 B1 | 3/2003 | Wanek et al. | 73/865.6 |
| 6,535,384 B2 | 3/2003 | Huang | 361/695 |
| 6,537,013 B2 | 3/2003 | Emberty et al. | |
| 6,544,309 B1 | 4/2003 | Hoefer et al. | 55/283 |
| 6,546,445 B1 | 4/2003 | Hayes | 710/305 |
| 6,553,532 B1 | 4/2003 | Aoki | |
| 6,560,107 B1 | 5/2003 | Beck et al. | |
| 6,565,163 B2 | 5/2003 | Behl et al. | 312/223.1 |
| 6,566,859 B2 | 5/2003 | Wolski et al. | 324/158.1 |
| 6,567,266 B2 | 5/2003 | Ives et al. | |
| 6,570,734 B2 | 5/2003 | Ostwald et al. | |
| 6,577,586 B1 | 6/2003 | Yang et al. | |
| 6,577,687 B2 | 6/2003 | Hall et al. | |
| 6,618,254 B2 | 9/2003 | Ives | |
| 6,626,846 B2 | 9/2003 | Spencer | |
| 6,628,518 B2 | 9/2003 | Behl et al. | 361/687 |
| 6,635,115 B1 | 10/2003 | Fairbairn et al. | |
| 6,640,235 B1 | 10/2003 | Anderson | 708/100 |
| 6,644,982 B1 | 11/2003 | Ondricek et al. | |
| 6,651,192 B1 | 11/2003 | Viglione et al. | 714/47 |
| 6,654,240 B1 | 11/2003 | Tseng et al. | 361/685 |
| 6,679,128 B2 | 1/2004 | Wanek et al. | 73/865.6 |
| 6,693,757 B2 | 2/2004 | Hayakawa et al. | 360/69 |
| 6,741,529 B1 | 5/2004 | Getreuer | |
| 6,746,648 B1 | 6/2004 | Mattila et al. | |
| 6,751,093 B1 | 6/2004 | Hsu et al. | 361/685 |
| 6,791,785 B1 | 9/2004 | Messenger et al. | |
| 6,791,799 B2 | 9/2004 | Fletcher | 360/255 |
| 6,798,651 B2 | 9/2004 | Syring et al. | 361/685 |
| 6,798,972 B1 | 9/2004 | Ito et al. | |
| 6,801,834 B1 | 10/2004 | Konshak et al. | |
| 6,806,700 B2 | 10/2004 | Wanek et al. | 324/158.1 |
| 6,811,427 B2 | 11/2004 | Garrett et al. | 439/378 |
| 6,826,046 B1 | 11/2004 | Muncaster et al. | 361/685 |
| 6,830,372 B2 | 12/2004 | Liu et al. | 374/57 |
| 6,832,929 B2 | 12/2004 | Garrett et al. | 439/378 |
| 6,861,861 B2 | 3/2005 | Song et al. | |
| 6,862,173 B1 | 3/2005 | Konshak et al. | |
| 6,867,939 B2 | 3/2005 | Katahara et al. | 360/53 |
| 6,892,328 B2 | 5/2005 | Klein et al. | 714/42 |
| 6,904,479 B2 | 6/2005 | Hall et al. | |
| 6,908,330 B2 | 6/2005 | Garrett et al. | 439/378 |
| 6,928,336 B2 | 8/2005 | Peshkin et al. | |
| 6,937,432 B2 | 8/2005 | Sri-Jayantha et al. | 360/97.01 |
| 6,957,291 B2 | 10/2005 | Moon et al. | |
| 6,965,811 B2 | 11/2005 | Dickey et al. | |
| 6,974,017 B2 | 12/2005 | Oseguera | |
| 6,976,190 B1 | 12/2005 | Goldstone | 714/42 |
| 6,980,381 B2 | 12/2005 | Gray et al. | 360/31 |
| 6,982,872 B2 | 1/2006 | Behl et al. | 361/687 |
| 7,006,325 B2 | 2/2006 | Emberty et al. | |
| 7,039,924 B2 | 5/2006 | Goodman et al. | |
| 7,054,150 B2 | 5/2006 | Orriss et al. | 361/685 |
| 7,070,323 B2 | 7/2006 | Wanek et al. | 374/45 |
| 7,076,391 B1 | 7/2006 | Pakzad et al. | 702/118 |
| 7,077,614 B1 | 7/2006 | Hasper et al. | |
| 7,088,541 B2 | 8/2006 | Orriss et al. | 360/71 |
| 7,092,251 B1 | 8/2006 | Henry | 361/685 |
| 7,106,582 B2 | 9/2006 | Albrecht et al. | 361/685 |
| 7,123,477 B2 | 10/2006 | Coglitore et al. | |
| 7,126,777 B2 | 10/2006 | Flechsig et al. | 360/59 |
| 7,130,138 B2 | 10/2006 | Lum et al. | 360/31 |
| 7,134,553 B2 | 11/2006 | Stephens | |
| 7,139,145 B1 | 11/2006 | Archibald et al. | 360/53 |
| 7,164,579 B2 | 1/2007 | Muncaster et al. | 361/685 |
| 7,167,360 B2 | 1/2007 | Inoue et al. | |
| 7,181,458 B1 | 2/2007 | Higashi | |
| 7,203,021 B1 | 4/2007 | Ryan et al. | |
| 7,203,060 B2 | 4/2007 | Kay et al. | 361/685 |
| 7,206,201 B2 | 4/2007 | Behl et al. | |
| 7,216,968 B2 | 5/2007 | Smith et al. | |
| 7,219,028 B2 | 5/2007 | Bae et al. | |
| 7,219,273 B2 | 5/2007 | Fisher et al. | |
| 7,227,746 B2 | 6/2007 | Tanaka et al. | 361/685 |
| 7,232,101 B2 | 6/2007 | Wanek et al. | 248/346.06 |
| 7,243,043 B2 | 7/2007 | Shin | |
| 7,248,467 B2 | 7/2007 | Sri-Jayantha et al. | 361/685 |
| 7,259,966 B2 | 8/2007 | Connelly, Jr. et al. | 361/727 |
| 7,273,344 B2 | 9/2007 | Ostwald et al. | |
| 7,280,353 B2 | 10/2007 | Wendel et al. | |
| 7,289,885 B2 | 10/2007 | Basham et al. | |
| 7,304,855 B1 | 12/2007 | Milligan et al. | 361/724 |
| 7,315,447 B2 | 1/2008 | Inoue et al. | |
| 7,349,205 B2 | 3/2008 | Hall et al. | |
| 7,353,524 B1 | 4/2008 | Lin et al. | |
| 7,385,385 B2 | 6/2008 | Magliocco et al. | |
| 7,395,133 B2 | 7/2008 | Lowe | |
| 7,403,451 B2 | 7/2008 | Goodman et al. | |
| 7,437,212 B2 | 10/2008 | Farchmin et al. | |
| 7,447,011 B2 | 11/2008 | Wade et al. | |
| 7,457,112 B2 | 11/2008 | Fukuda et al. | |
| 7,467,024 B2 | 12/2008 | Flitsch | |
| 7,476,362 B2 | 1/2009 | Angros | 422/100 |
| 7,483,269 B1 | 1/2009 | Marvin, Jr. et al. | |
| 7,505,264 B2 | 3/2009 | Hall et al. | |
| 7,554,811 B2 | 6/2009 | Scicluna et al. | |
| 7,568,122 B2 | 7/2009 | Mechalke et al. | |
| 7,570,455 B2 | 8/2009 | Deguchi et al. | |
| 7,573,715 B2 | 8/2009 | Mojaver et al. | |
| 7,584,851 B2 | 9/2009 | Hong et al. | |
| 7,612,996 B2 | 11/2009 | Atkins et al. | |
| 7,625,027 B2 | 12/2009 | Kiaie et al. | |
| 7,630,196 B2 | 12/2009 | Hall et al. | |
| 7,643,289 B2 | 1/2010 | Ye et al. | |
| 7,646,596 B2 | 1/2010 | Ng | |
| 2001/0006453 A1 | 7/2001 | Glorioso et al. | 361/685 |
| 2001/0044023 A1 | 11/2001 | Johnson et al. | |
| 2001/0046118 A1 | 11/2001 | Yamanashi et al. | 361/687 |
| 2001/0048590 A1 | 12/2001 | Behl et al. | |
| 2002/0030981 A1 | 3/2002 | Sullivan et al. | |
| 2002/0044416 A1 | 4/2002 | Harmon, III et al. | 361/685 |
| 2002/0051338 A1 | 5/2002 | Jiang et al. | |
| 2002/0071248 A1 | 6/2002 | Huang et al. | 361/685 |
| 2002/0079422 A1 | 6/2002 | Jiang | |
| 2002/0090320 A1 | 7/2002 | Burow et al. | |
| 2002/0116087 A1 | 8/2002 | Brown | |
| 2002/0161971 A1 | 10/2002 | Dimitri et al. | 711/114 |
| 2002/0172004 A1 | 11/2002 | Ives et al. | 361/685 |
| 2003/0035271 A1 | 2/2003 | Lelong et al. | 361/724 |
| 2003/0043550 A1 | 3/2003 | Ives | 361/726 |
| 2003/0206397 A1 | 11/2003 | Allgeyer et al. | 361/685 |
| 2004/0165489 A1 | 8/2004 | Goodman et al. | |
| 2004/0230399 A1 | 11/2004 | Shin | 702/182 |
| 2004/0236465 A1 | 11/2004 | Butka et al. | |
| 2004/0264121 A1 | 12/2004 | Orriss et al. | 361/685 |
| 2005/0004703 A1 | 1/2005 | Christie | |
| 2005/0010836 A1 | 1/2005 | Bae et al. | 714/25 |
| 2005/0018397 A1 | 1/2005 | Kay et al. | 361/685 |
| 2005/0055601 A1 | 3/2005 | Wilson et al. | |
| 2005/0057849 A1 | 3/2005 | Twogood et al. | |
| 2005/0069400 A1 | 3/2005 | Dickey et al. | |
| 2005/0109131 A1 | 5/2005 | Wanek et al. | 73/865.9 |
| 2005/0116702 A1 | 6/2005 | Wanek et al. | 324/158.1 |
| 2005/0131578 A1 | 6/2005 | Weaver | |
| 2005/0179457 A1 | 8/2005 | Min et al. | |
| 2005/0207059 A1 | 9/2005 | Cochrane | |
| 2005/0219809 A1 | 10/2005 | Muncaster et al. | 361/685 |
| 2005/0225338 A1 | 10/2005 | Sands et al. | 324/754 |
| 2005/0270737 A1 | 12/2005 | Wilson et al. | 361/685 |

| | | | | | | |
|---|---|---|---|---|---|---|
| 2006/0023331 A1 | 2/2006 | Flechsig et al. | | EP | 1 760 722 | 3/2007 |
| 2006/0028802 A1 | 2/2006 | Shaw et al. ............... 361/728 | | EP | 1760722 | 3/2007 |
| 2006/0066974 A1 | 3/2006 | Akamatsu et al. | | EP | 1612798 | 11/2007 |
| 2006/0130316 A1 | 6/2006 | Takase et al. ............ 29/603.09 | | GB | 2241118 | 8/1991 |
| 2006/0190205 A1 | 8/2006 | Klein et al. | | GB | 2276275 | 9/1994 |
| 2006/0227517 A1 | 10/2006 | Zayas et al. ................ 361/748 | | GB | 2299436 | 10/1996 |
| 2006/0250766 A1 | 11/2006 | Blaalid et al. .............. 361/685 | | GB | 2 312 984 | 11/1997 |
| 2006/0269384 A1 | 11/2006 | Kiaie et al. .............. 414/222.02 | | GB | 2312984 | 11/1997 |
| 2007/0034368 A1 | 2/2007 | Atkins et al. ................ 165/247 | | GB | 2328782 | 3/1999 |
| 2007/0035874 A1 | 2/2007 | Wendel et al. | | GB | 2332523 A * | 6/1999 |
| 2007/0035875 A1 | 2/2007 | Hall et al. | | GB | 2439844 | 7/2008 |
| 2007/0053154 A1 | 3/2007 | Fukuda et al. | | JP | 61-115279 | 6/1986 |
| 2007/0082907 A1 | 4/2007 | Canada et al. | | JP | 62-177621 | 8/1987 |
| 2007/0127202 A1 | 6/2007 | Scicluna et al. ............ 361/685 | | JP | 62-239394 | 10/1987 |
| 2007/0127206 A1 | 6/2007 | Wade et al. ................ 361/687 | | JP | 62-251915 | 11/1987 |
| 2007/0195497 A1 | 8/2007 | Atkins ....................... 361/685 | | JP | 63-002160 | 1/1988 |
| 2007/0248142 A1 | 10/2007 | Roundtree et al. | | JP | 63-004483 | 1/1988 |
| 2007/0253157 A1 | 11/2007 | Atkins et al. ............... 361/685 | | JP | 63-016482 | 1/1988 |
| 2007/0286045 A1 | 12/2007 | Onagi et al. | | JP | 63-062057 | 3/1988 |
| 2008/0007865 A1 | 1/2008 | Orriss et al. .............. 360/97.01 | | JP | 63-201946 | 8/1988 |
| 2008/0030945 A1 | 2/2008 | Majaver et al. | | JP | 63-214972 | 9/1988 |
| 2008/0112075 A1 | 5/2008 | Farquhar et al. .......... 360/97.02 | | JP | 63-269376 | 11/1988 |
| 2008/0239564 A1 | 10/2008 | Farquhar et al. .......... 360/97.02 | | JP | 63-195697 | 12/1988 |
| 2008/0282275 A1 | 11/2008 | Zaczek et al. | | JP | 64-089034 | 4/1989 |
| 2008/0282278 A1 | 11/2008 | Barkley | | JP | 2-091565 | 3/1990 |
| 2009/0028669 A1 | 1/2009 | Rebstock | | JP | 2-098197 | 4/1990 |
| 2009/0082907 A1 | 3/2009 | Stuvel et al. | | JP | 2-185784 | 7/1990 |
| 2009/0122443 A1 | 5/2009 | Farquhar et al. | | JP | 2-199690 | 8/1990 |
| 2009/0142169 A1 | 6/2009 | Garcia et al. | | JP | 2-278375 | 11/1990 |
| 2009/0153992 A1 | 6/2009 | Garcia et al. | | JP | 2-297770 | 12/1990 |
| 2009/0153993 A1 | 6/2009 | Garcia et al. | | JP | 3-008086 | 1/1991 |
| 2009/0153994 A1 | 6/2009 | Merrow | | JP | 3-078160 | 4/1991 |
| 2009/0175705 A1 | 7/2009 | Nakao et al. | | JP | 3-105704 | 5/1991 |
| 2009/0261047 A1 | 10/2009 | Merrow | | JP | 3-207947 | 9/1991 |
| 2009/0261228 A1 | 10/2009 | Merrow | | JP | 3-210662 | 9/1991 |
| 2009/0261229 A1 | 10/2009 | Merrow | | JP | 3-212859 | 9/1991 |
| 2009/0262444 A1 | 10/2009 | Polyakov et al. | | JP | 3-214490 | 9/1991 |
| 2009/0262445 A1 | 10/2009 | Noble et al. | | JP | 3-240821 | 10/1991 |
| 2009/0262454 A1 | 10/2009 | Merrow | | JP | 3-295071 | 12/1991 |
| 2009/0262455 A1 | 10/2009 | Merrow | | JP | 4-017134 | 1/1992 |
| 2009/0265032 A1 | 10/2009 | Toscano et al. | | JP | 4-143989 | 5/1992 |
| 2009/0265043 A1 | 10/2009 | Merrow | | JP | 4-172658 | 6/1992 |
| 2009/0265136 A1 | 10/2009 | Garcia et al. | | JP | 4-214288 | 8/1992 |
| 2009/0297328 A1 | 12/2009 | Slocum, III | | JP | 4-247385 | 9/1992 |
| | | | | JP | 4-259956 | 9/1992 |
| FOREIGN PATENT DOCUMENTS | | | | JP | 4-307440 | 10/1992 |
| CN | 1177187 | 3/1998 | | JP | 4-325923 | 11/1992 |
| CN | 2341188 | 9/1999 | | JP | 5-035053 | 2/1993 |
| CN | 1114109 | 7/2003 | | JP | 5-035415 | 2/1993 |
| CN | 1192544 | 3/2005 | | JP | 5-066896 | 3/1993 |
| DE | 3786944 | 11/1993 | | JP | 5-068257 | 3/1993 |
| DE | 69111634 | 5/1996 | | JP | 5-073566 | 3/1993 |
| DE | 69400145 | 10/1996 | | JP | 5-073803 | 3/1993 |
| DE | 19701548 | 8/1997 | | JP | 5-101603 | 4/1993 |
| DE | 19804813 | 9/1998 | | JP | 5-173718 | 7/1993 |
| DE | 69614460 | 6/2002 | | JP | 5-189163 | 7/1993 |
| DE | 69626584 | 12/2003 | | JP | 5-204725 | 8/1993 |
| DE | 19861388 | 8/2007 | | JP | 5-223551 | 8/1993 |
| EP | 0210497 | 7/1986 | | JP | 6-004220 | 1/1994 |
| EP | 0242970 | 10/1987 | | JP | 6-004981 | 1/1994 |
| EP | 0 277 634 | 8/1988 | | JP | 6-162645 | 6/1994 |
| EP | 0 277 634 A | 8/1988 | | JP | 6-181561 | 6/1994 |
| EP | 0356977 | 8/1989 | | JP | 6-215515 | 8/1994 |
| EP | 0442642 | 2/1991 | | JP | 6-274943 | 9/1994 |
| EP | 0466073 | 7/1991 | | JP | 6-314173 | 11/1994 |
| EP | 0776009 | 11/1991 | | JP | 7-007321 | 1/1995 |
| EP | 0582017 | 2/1994 | | JP | 7-029364 | 1/1995 |
| EP | 0617570 | 9/1994 | | JP | 7-037376 | 2/1995 |
| EP | 0635836 | 1/1995 | | JP | 7-056654 | 3/1995 |
| EP | 741508 | 11/1996 | | JP | 7-111078 | 4/1995 |
| EP | 0757320 | 2/1997 | | JP | 7-115497 | 5/1995 |
| EP | 0757351 | 2/1997 | | JP | 7-201082 | 8/1995 |
| EP | 0840476 | 5/1998 | | JP | 7-226023 | 8/1995 |
| EP | 1 045 301 | 10/2000 | | JP | 7-230669 | 8/1995 |
| EP | 1 045 301 A | 10/2000 | | JP | 7-257525 | 10/1995 |
| EP | 1209557 | 5/2002 | | JP | 1982246 | 10/1995 |
| EP | 1 422 713 | 5/2004 | | JP | 7-307059 | 11/1995 |
| EP | 1422713 | 5/2004 | | JP | 8007994 | 1/1996 |
| EP | 1234308 | 5/2006 | | JP | 8-030398 | 2/1996 |

| | | |
|---|---|---|
| JP | 8-030407 | 2/1996 |
| JP | 8-079672 | 3/1996 |
| JP | 8-106776 | 4/1996 |
| JP | 8-110821 | 4/1996 |
| JP | 8-167231 | 6/1996 |
| JP | 8-212015 | 8/1996 |
| JP | 8-244313 | 9/1996 |
| JP | 8-263525 | 10/1996 |
| JP | 8-263909 | 10/1996 |
| JP | 8-297957 | 11/1996 |
| JP | 2553315 | 11/1996 |
| JP | 9-044445 | 2/1997 |
| JP | 9-064571 | 3/1997 |
| JP | 9-082081 | 3/1997 |
| JP | 2635127 | 7/1997 |
| JP | 9-306094 | 11/1997 |
| JP | 9-319466 | 12/1997 |
| JP | 10-040021 | 2/1998 |
| JP | 10-049365 | 2/1998 |
| JP | 10-064173 | 3/1998 |
| JP | 10-098521 | 4/1998 |
| JP | 2771297 | 7/1998 |
| JP | 10-275137 | 10/1998 |
| JP | 10-281799 | 10/1998 |
| JP | 10-320128 | 12/1998 |
| JP | 10-340139 | 12/1998 |
| JP | 2862679 | 3/1999 |
| JP | 11-134852 | 5/1999 |
| JP | 11-139839 | 5/1999 |
| JP | 2906930 | 6/1999 |
| JP | 11-203201 | 7/1999 |
| JP | 11-213182 | 8/1999 |
| JP | 11-327800 | 11/1999 |
| JP | 11-353128 | 12/1999 |
| JP | 11-353129 | 12/1999 |
| JP | 2000-056935 | 2/2000 |
| JP | 2000-066845 | 3/2000 |
| JP | 2000-112831 | 4/2000 |
| JP | 2000-113563 | 4/2000 |
| JP | 2000-114759 | 4/2000 |
| JP | 2000-125290 | 4/2000 |
| JP | 3052183 | 4/2000 |
| JP | 2000-132704 | 5/2000 |
| JP | 2000-149431 | 5/2000 |
| JP | 2000-228686 | 8/2000 |
| JP | 2000-235762 | 8/2000 |
| JP | 2000-236188 | 8/2000 |
| JP | 2000-242598 | 9/2000 |
| JP | 2000-278647 | 10/2000 |
| JP | 3097994 | 10/2000 |
| JP | 2000-305860 | 11/2000 |
| JP | 2001-005501 | 1/2001 |
| JP | 2001-023270 | 1/2001 |
| JP | 2001-100925 | 4/2001 |
| JP | 2002-42446 | 2/2002 |
| JP | 2007-87498 | 4/2007 |
| JP | 2007-188615 | 7/2007 |
| JP | 2007 220184 | 8/2007 |
| JP | 2007-220184 | 8/2007 |
| JP | 2007-293936 | 11/2007 |
| JP | 2007-305206 | 11/2007 |
| JP | 2007-305290 | 11/2007 |
| JP | 2007-328761 | 12/2007 |
| JP | 2008-503824 | 2/2008 |
| KR | 10-1998-0035445 | 8/1998 |
| KR | 10-0176527 | 11/1998 |
| KR | 10-0214308 | 8/1999 |
| KR | 10-0403039 | 10/2003 |
| SG | 45223 | 1/1998 |
| TW | 387574 | 4/2000 |
| WO | WO 89/01682 | 8/1988 |
| WO | WO 97/06532 | 2/1997 |
| WO | WO 00/49487 | 2/2000 |
| WO | WO 00/67253 | 11/2000 |
| WO | WO 01/09627 | 2/2001 |
| WO | WO 01/41148 | 6/2001 |
| WO | WO 03/013783 | 2/2003 |
| WO | WO 03/021597 | 3/2003 |
| WO | WO 03/021598 | 3/2003 |
| WO | WO 03/067385 | 8/2003 |
| WO | WO 2004/006260 | 1/2004 |
| WO | WO 2004/114286 | 12/2004 |
| WO | WO 2005/024830 | 3/2005 |
| WO | WO 2005/024831 | 3/2005 |
| WO | WO 2005/109131 | 11/2005 |
| WO | WO 2006/030185 | 3/2006 |
| WO | WO 2006/048611 | 5/2006 |
| WO | WO 2006/100441 | 9/2006 |
| WO | WO 2006/100445 | 9/2006 |
| WO | WO 2007/031729 | 3/2007 |

OTHER PUBLICATIONS

Biber et al., "Disk Drive Drawer Thermal Management", Advances in Electronic Packaging vol. 1:43-46, 1995.
Chung et al., "Vibration Absorber for Reduction of the In-plane Vibration in an Optical Disk Drive", IEEE Transactions on Consumer Electronics, Vo. 48, May 2004.
FlexStar Technology, 30E/Cascade Users Manual, Doc #98-36387-00 Rev. 1.8, pp. 1-33.
FlexStar Technology, "A World of Storage (1999) Testing Solutions," http://www.flexstar.com, 1 page (1999).
FlexStar Technology, "Environment Chamber Products," http://www.flexstar.com, 1 page (1999).
FlexStar Technology, "FlexStar's Family of Products," http://www.flexstar.com, 1 page (1999).
Gurumurthi, "The Need for temperature-Aware Storage Systems", The Tenth Intersociety conference on Thermal and Thermomechanical Phenomena in Electronics, ITHERM pp. 387-394, 2006.
Gurumurthi et al., "Thermal Issues in Disk Drive Design: Challenges and Possible Solutions", ACM Transactions on Storage 2:41-73, Feb. 2006.
Henderson, "HAD High Aerial Densities Require Solid Test Fixtures", Flexstar Technology.
Lindner, "Disk drive mounting", IBM Technical Disclosure Brochure, vol. 16, No. 3, pp. 903-904, Aug. 1973.
Morgenstern, Micropolis Drives Target High-end Apps; Technology Provides Higher Uninterrupted Data Transfer. (Applications; Microdisk AV LS 3020 and 1050AV and 1760AV LT Stackable Hard Drive Systems) (Product Announcement) MacWeek, vol. 8, No. 6, p. 8; Feb. 7, 1994.
Morris, "Zero Cost Power and Cooling Monitor System", www.delphion.com/tdbs/tdb?order=94A+61950, 3 pages, Jan. 15, 2008.
Notification of Transmittal of The International Search Report and the Written Opinion of the International Searching Authority, or the Declaration, PCT/US2008/086181, 15 pages, Mar. 16, 2009.
Park, "Vibration and Noise Reduction of an Optical Disk Drive by Using a Vibration Absorber Methods and Apparatus for Securing Disk Drives in a Disk", IEEE Transactions on Consumer Electronics, vol. 48, Nov. 2002.
Ruwart et al., "Performance Impact of External Vibration on Consumer-grade and enterprise-class Disk Drives", Proceedings of the $22^{nd}$ IEEE/$13^{th}$ Goddard Conference on Mass Storage Systems and Technologies, 2005.
Seagate Product Marketing, "Seagate's Advanced Multidrive System (SAMS) Rotational Vibration Feature", Publication TP-229D, Feb. 2000.
Schroeder et al., "Disk Failures in the Real World: What does an MTTP of 1,000,000 hours mean to you?", In FAST'07: $5^{th}$ USENIX Conference on File and Storage Technologies, San Jose, CA, Feb. 14-16, 2007.
Schulze et al., "How Reliable is a Raid?," COMPCON Spring apos; 89. Thirty-Fouth IEEE Computer Society International Conference: Intellectual Leverage, Digest of papers; pp. 118-123, Feb. 27-Mar. 3, 1989.
Winchester, "Automation Specialists Use Machine Vision as a System Development Tool", IEE Computing & Control Engineering, Jun./Jul. 2003.
Xyratex website "Storage Infrastructure" www.xyratex.com/Products/storage-infrastructure/default.aspx 1995-2008.
Xyratex website "Production Test Systems" www.xyratex.com/Products/production-test-systems/default.aspx 1995-2008.

Xyratex website "Single cell—Production Test Systems" www.xyratex.com/products/production-test-systems/single-cell.aspx 1995-2008.

Xyratex website "Continuous Innovation—Production Test Systems" www.xyratex.com/products/production-test-systems/continuous-innovation.aspx 1995-2008.

Xyratex website "Key Advantages—Production Test Systems" www.xyratex.com/products/production-test-systems/advantages.aspx 1995-2008.

Xyratex website "Testing Drives Colder—Production Test Systems" www.xyratex.com/products/productino-test-systems/colder.aspx 1995-2008.

"Xyratex to Debut its New Automated Test Solution for 2.5-Inch Disk Drives at DISKCON USA 2004" 2004 PR Newswire Europe www.prnewswire.co.uk/cgi/news/release?id=130103.

"Automated Production Test Solutions", Xyratex Product Test brochure, 2006.

Xyratex "Process Challenges in the Hard Drive Industry" slide presentation, 2006 Asian Diskcon.

Suwa et al., "Evaluation System for Residual Vibration from HDD Mounting Mechanism" IEEE Transactions on Magnetics, vol. 35, No. 2, pp. 868-873, Mar. 1999.

Suwa et al., "Rotational Vibration Suppressor" IBM Technical Disclosure Bulletin Oct. 1991.

Invitation to Pay Additional Fees and, Where Applicable, Protest Fee, PCT/US2008/086814, pp. 1-5, dated Mar. 4, 2009.

Invitation to Pay Additional Fees and, Where Applicable, Protest Fee, PCT/US2008/086809, pp. 1-6, dated Mar. 4, 2009.

Abraham et al., "Thermal Proximity Imaging of Hard-Disk Substrates", IEEE Transactions on Mathematics 36:3997-4004, Nov. 2000.

Anderson et al., "High Reliability Variable Load Time Controllable Vibration Free Thermal Processing Environment", Delphion, hhtps://www.delphion.com/tdbs/tdb?order=93A+63418, 3 pages, Mar. 18, 2009.

Asbrand, "Engineers at One Company Share the Pride and the Profits of Successful Product Design", Professional Issues, 4 pages, 1987.

Bair et al., "Measurements of Asperity Temperatures of a Read/Write Head Slider Bearing in Hard Magnetic Recording Disks", Journal of Tribology 113:547-554, Jul. 1991.

Christensen, "How Can Great firms Fail? Insights from the hard Disk Drive Industry", Harvard Business School Press, pp. 1-26, 2006.

Haddad et al., "A new Mounting Adapter For Computer Peripherals with Improved Reliability, Thermal Distribution, Low Noise and Vibration Reduction", ISPS, Advances in Information Storage and Processing Systems, 1:97-108, 1995.

HighBeam Research website "ACT debuts six-zone catalytic gas heater. (American Catalytic Technologies offers new heaters)" www.highbeam.com, 4 pages, 1998.

HighBeam Research website "Asynchronous Testing Increases Throughput." www.highbeam.com, 7 pages, 2000.

HighBeam Research website "Credence announces Production Release of the EPRO AQ Series for Integrated Test and Back-end Processing." www.highbeam.com, 4 pages, 1995.

HighBeam Research website "Test Multiple Parts At Once for Air Leaks. (Brief Article)", www.highbeam.com, 1 page, 1999.

Iwamiya, "Hard Drive Cooling Using a Thermoelectric Cooler", EEP-vol. 19-2, Advances in Electronic Packaging, vol. 2:2203-2208, ASME 1997.

Ku, "Investigation of Hydrodynamic Bearing Friction in Data Storage information System Spindle Motors", ISPSvol. 1, Advances in Information Storage and Processing Systems, pp. 159-165, ASME 1995.

McAuley, "Recursive Time Trapping for Synchronization of Product and CHAMBER Profiles for Stress Test", Delphion, www.delphion.com/tdbs/tdb?order=88A+60957, 3 pages, Mar. 18, 2009.

Prater et al., "Thermal and Heat-Flow Aspects of Actuators for Hard Disk Drives", InterSociety Conference on Thermal Phenomena, pp. 261-268, 1994.

Terwiesch et al., "An Exploratory Study of International Product Transfer and Production Ramp-Up in the Data Storage Industry", The Information Storage Industry Center, University of California, www-irps.ucsd.edu/~sloan/, pp. 1-31, 1999.

Tzeng, "Dynamic Torque Characteriestics of Disk-Drive Spindle Bearings", ISPS-vol. 1, Advances in Information Storage and Processing Systems, pp. 57-63, ASME 1995.

Tzeng, "Measurements of Transient Thermal Strains in a Disk-Drive Actuator", InterSociety conference on Thermal Phenomena, pp. 269-274, 1994.

Wilson-7000 disk Drive Analyzer Product Literature, date accessed Jan. 28, 2009, 2 pages.

Notification of Transmittal of the International Search Report and the Written Opinion of the International Searching Authority, or the Declaration, for International Application No. PCT/US2009/039926, Sep. 1, 2009, 13 pages.

Notification of Transmittal of the International Search Report and the Written Opinion of the International Searching Authority, or the Declaration, for International Application No. PCT/US2009/039591, Aug. 31, 2009, 10 pages.

International Search Report and Written Opinion of the International Searching Authority in connection with International Application No. PCT/US2008/086814; dated Sep. 18, 2009. 50 Pages.

International Search Report and Written Opinion of International Searching Authority in connection with International Application No. PCT/US2008/086809; dated Sep. 17, 2009. 52 Pages.

Abramovitch, "Rejecting Rotational Disturbances on Small Disk Drives Using Rotational Accelerometers", Proceedings of the 1996 IFAC World Congress in San Francisco, CA, Jul. 1996 http://dabramovitch.com/pubs/amrfac_matj.pdf.

Ali et al., "Modeling and Simulation of Hard Disk Drive Final Assembly Using a HDD Template" Proceedings of the 2007 Winter Simulation Conference, IEEE pp. 1641-1650, 2007 http://portal.acm.org/citation.cfm?id=1351837.

Anderson et al., "Clinical chemistry: concepts and applications", The McGraw-Hill Companies, Inc., pp. 131-132, 2003.

Curtis et al., "InPhase Professional Archive Drive Architecture" Dec. 17, 2007 http://www.science.edu/TechoftheYear/Nominees/InPhase/Holographic%20Storage.pdf.

Findeis et al., "Vibration Isolation Techniques Sutiable for Portable Electronic Speckle Pattern Interferometry", Proc. SPIE vol. 4704, pp. 159-167, 2002 http://www.ndt.uct.ac.za/Papers/spiendt2002.pdf.

Frankovich, "The Basics of Vibration Isolation Using Elastomeric Materials", EARSC 2005 http://www.isoloss.com/pdfs/engineering/BasicsofVibrationIsolation.pdf.

Grochowski et al., "Future Trends in Hard Disk Drives" IEEE Transactions on Magnetics, vol. 32, No. 3, pp. 1850-1854, May 1996 http://svn.tribler.org/abc/branches/leo/dataset/preferences/johan/johan-68.pdf.

Gurumurthi et al., "Disk Drive Roadmap from the Thermal Perspective: A Case for Dynamic Thermal Management", International Symposium on Computer Architecture Proceedings of the $32^{nd}$ Annual International Symposium on Computer Architecture, pp. 38-49, 2005 http://portal.acm.org/citation.cfm?id=1069807.1069975.

Johnson et al., "Performance Measurements of Tertiary Storage Devices", Proceedings of the $24^{th}$ VLDB Conference, New York, pp. 50-61, 1998.

Nagarajan, "Survey of Cleaning and cleanliness Measurement in Disk Drive Manufacture", North Carolina Department of Environment and Natural Resources, Feb. 1997.

Yee Leong Low et al., "Thermal network model for temperature prediction in hard disk drive" Journal Microsystem Technologies, vol. 15, No. 10-11, pp. 1653-1656, October 2009 http://www.springerlink.com/content/20668jn67pk426r5/.

Annex to Form PCT/ASA/206 Communication Relating to the Results of the Partial International Search, for International Application No. PCT/US2008/086814, dated Apr. 3, 2009, 1 page.

Annex to Form PCT/ASA/206 Communication Relating to the Results of the Partial International Search, for International Application No. PCT/US2008/086809, dated Apr. 3, 2009, 1 page.

Notification of Transmittal of the International Search Report and the Written Opinion of the International Searching Authority, or the Declaration, for International Application No. PCT/US2008/086814, Sep. 18, 2009, 17 pages.

Notification of Transmittal of the International Search Report and the Written Opinion of the International Searching Authority, or the Declaration, for International Application No. PCT/US2009/039888, Sep. 28, 2009, 13 pages.
Notification of Transmittal of the International Search Report and the Written Opinion of the International Searching Authority, or the Declaration, for International Application No. PCT/US2009/039921, Sep. 25, 2009, 14 pages.
Notification of Transmittal of the International Search Report and the Written Opinion of the International Searching Authority, or the Declaration, for International Application No. PCT/US2009/040058, Sep. 29, 2009, 13 pages.
Notification of Transmittal of the International Search Report and the Written Opinion of the International Searching Authority, or the Declaration, for International Application No. PCT/US2009/040829, Oct. 28, 2009, 13 pages.
Notification of Transmittal of the International Search Report and the Written Opinion of the International Searching Authority, or the Declaration, for International Application No. PCT/US2009/039590, Oct. 30, 2009, 10 pages.
Notification of Transmittal of the International Search Report and the Written Opinion of the International Searching Authority, or the Declaration, for International Application No. PCT/US2009/040835, Oct. 30, 2009, 13 pages.
Notification of Transmittal of the International Search Report and the Written Opinion of the International Searching Authority, or the Declaration, for International Application No. PCT/US2009/040757, Nov. 23, 2009, 12 pages.
Notification of Transmittal of the International Search Report and the Written Opinion of the International Searching Authority, or the Declaration, for International Application No. PCT/US2009/039898, Nov. 24, 2009, 12 pages.
Notification of Transmittal of the International Search Report and the Written Opinion of the International Searching Authority, or the Declaration, for International Application No. PCT/US2009/040795, Nov. 26, 2009, 13 pages.
Notification of Transmittal of the International Search Report and the Written Opinion of the International Searching Authority, or the Declaration, for International Application No. PCT/US2009/040888, Dec. 29, 2009, 14 pages.
Notification of Transmittal of the International Search Report and the Written Opinion of the International Searching Authority, or the Declaration, for International Application No. PCT/US2009/040888, Dec. 29, 2009, 14 pages.
Notification of Transmittal of the International Search Report and the Written Opinion of the International Searching Authority, or the Declaration, for International Application No. PCT/US2009/040894, Dec. 22, 2009, 12 pages.
Notification of Transmittal of the International Search Report and the Written Opinion of the International Searching Authority, or the Declaration, for International Application No. PCT/US2009/039934, Dec. 23, 2009, 12 pages.
Notification of Transmittal of the International Search Report and the Written Opinion of the International Searching Authority, or the Declaration, for International Application No. PCT/US2009/040965, Dec. 23, 2009, 12 pages.
Notification of Transmittal of the International Search Report and the Written Opinion of the International Searching Authority, or the Declaration, for International Application No. PCT/US2009/040973, Jan. 11, 2010, 13 pages.
Cardinal Intellectual Property's search report including the results of a search for the features of the claims included in the U.S. patent application entitled "Transferring Disk Drives Within Disk Drive Testing Systems", inventors: Polyakov et al, and having assigned U.S. Appl. No. 12/727,150. The foregoing U.S. patent application is a continuation of U.S. Appl. No. 12/104,536.
Cardinal Intellectual Property's search report including the results of a search for the features of the claims included in the U.S. patent application entitled "Transferring Storage Device Within Storage Device Testing Systems", inventors: John P. Toscano et al., and having assigned U.S. Appl. No. 12/727,201. The foregoing U.S. patent application is a continuation of U.S. Appl. No. 12/424,980.

Cardinal Intellectual Property's search report including the results of a search for the features of the claims included in the U.S. patent application entitled "Processing Storage Devices", inventors: Richard W. Slocum III., and having assigned U.S. Appl. No. 12/727,619. The foregoing U.S. patent application is a continuation of U.S. Appl. No. 12/474,388.
Cardinal Intellectual Property's search report including the results of a search for the features of the claims included in the U.S. patent application entitled "Bulk Feeding Disk Drives To Disk Drive Testing Systems", inventors: Noble et al., and having assigned U.S. Appl. No. 12/726,856. The foregoing U.S. patent application is a continuation of U.S. Appl. No. 12/104,869.
Cardinal Intellectual Property's search report including the results of a search for the features of the claims included in the U.S. patent application entitled "Dependent Temperature Control Within Disk Drive Testing Systems", inventors: Merrow et al., and having assigned U.S. Appl. No. 12/727,207. The foregoing U.S. patent application is a continuation of U.S. Appl. No. 12/105,069.
Cardinal Intellectual Property's search report including the results of a search for the features of the claims included in the U.S. patent application entitled "Test Slot Cooling System for a Storage Device Testing System", inventors: Merrow et al., and having assigned U.S. Appl. No. 12/727,700. The foregoing U.S. patent application is a continuation of U.S. Appl. No. 12/503,567.
Cardinal Intellectual Property's search report including the results of a search for the features of the claims included in the U.S. patent application entitled "Storage Device Testing System Cooling", inventors: Brian S. Merrow and having assigned U.S. Appl. No. 12/775,560. The foregoing U.S. patent application is a continuation of U.S. Appl. No. 12/698,575.
Cardinal Intellectual Property's search report including the results of a search for the features of the claims included in the U.S. patent application entitled "Conductive Heating", inventors: Brian S. Merrow et al., and having assigned U.S. Appl. No. 12/836,915. The foregoing U.S. patent application is a continuation of U.S. Appl. No. 12/503,593.
Cardinal Intellectual Property's search report including the results of a search for the features of the claims included in the U.S. patent application entitled "Conductive Temperature Sensing", inventors: Brian S. Merrow et al., and having assigned U.S. Appl. No. 12/760,305. The foregoing U.S. patent application is a continuation of U.S. Appl. No. 12/503,687.
Cardinal Intellectual Property's search report including the results of a search for the features of the claims included in the U.S. patent application entitled "Solid State Temperature Control of Hard Drive Tester", inventors: Brian S. Merrow, and having assigned U.S. Appl. No. 12/856,056. The foregoing U.S. patent application is a continuation of U.S. Appl. No. 12/105,103.
Cardinal Intellectual Property's search report including the results of a search for the features of the claims included in the U.S. patent application entitled "Single Test Slot for Dynamic Isolation of Hard Drive", inventors: Brian S. Merrow and having assigned U.S. Appl. No. 12/767,142. The foregoing U.S. patent application is a continuation of U.S. Appl. No. 12/105,105.
Cardinal Intellectual Property's search report including the results of a search for the features of the claims included in the U.S. patent application entitled "Hard Drive Transport Sled", inventors: Brian S. Merrow et al., and having assigned U.S. Appl. No. 12/766,680. The foregoing U.S. patent application is a continuation of U.S. Appl. No. 12/959,133.
Cardinal Intellectual Property's search report including the results of a search for the features of the claims included in the U.S. patent application entitled "Chilled Water Temp Control of Disk Drive Tester", inventors: Brian S. Merrow and having assigned U.S. Appl. No. 12/937,918. The foregoing U.S. patent application is a continuation of U.S. Appl. No. 12/105,061.
Cardinal Intellectual Property's search report including the results of a search for the features of the claims included in the U.S. patent application entitled "Transferring Disk Drives Within Disk Drive Testing Systems", inventors: Polyakov et al, and having assigned U.S. Appl. No. 12/727,150. The foregoing U.S. patent application is a continuation of U.S. Appl. No. 12/104,536. Revised as of May 27, 2010.

Cardinal Intellectual Property's search report including the results of a search for the features of the claims included in the U.S. patent application entitled "Transferring Storage Devices Within Storage Device Testing Systems", inventors: John P. Toscano et al., and having assigned U.S. Appl. No. 12/727,201. The foregoing U.S. patent application is a continuation of U.S. Appl. No. 12/424,980. Revised as of Jan. 4, 2010.

Cardinal Intellectual Property's search report including the results of a search for the features of the claims included in the U.S. patent application entitled "Processing Storage Devices", inventors: Richard W. Slocum III., and having assigned U.S. Appl. No. 12/727,619. The foregoing U.S. patent application is a continuation of U.S. Appl. No. 12/474,388. Revised as of Jan. 5, 2010.

Cardinal Intellectual Property's search report including the results of a search for the features of the claims included in the U.S. patent application entitled "Bulk Feeding Disk Drives To Disk Drive Testing Systems", inventors: Noble et al., and having assigned U.S. Appl. No. 12/726,856. The foregoing U.S. patent application is a continuation of U.S. Appl. No. 12/104,869. Revised as of Jan. 15, 2010.

Cardinal Intellectual Property's search report including the results of a search for the features of the claims included in the U.S. patent application entitled "Dependent Temperature Control Within Disk Drive Testing Systems", inventors: Merrow et al., and having assigned U.S. Appl. No. 12/727,207. The foregoing U.S. patent application is a continuation of U.S. Appl. No. 12/105,069. Revised as of Jan. 13, 2010.

Cardinal Intellectual Property's search report including the results of a search for the features of the claims included in the U.S. patent application entitled "Test Slot Cooling System for a Storage Device Testing System", inventors: Merrow et al., and having assigned U.S. Appl. No. 12/727,700. The foregoing U.S. patent application is a continuation of U.S. Appl. No. 12/503,567. Revised as of Jan. 13, 2010.

Cardinal Intellectual Property's search report including the results of a search for the features of the claims included in the U.S. patent application entitled "Storage Device Testing System Cooling", inventors: Brian S. Merrow and having assigned U.S. Appl. No. 12/775,560. The foregoing U.S. patent application is a continuation of U.S. Appl. No. 12/698,575. Revised as of Feb. 17, 2010.

Cardinal Intellectual Property's search report including the results of a search for the features of the claims included in the U.S. patent application entitled "Conductive Heating" inventors: Brian S. Merrow et al., and having assigned U.S. Appl. No. 12/760,164. The foregoing U.S. patent application is a continuation of U.S. Appl. No. 12/503,593. Revised as of Jan. 6, 2010.

Cardinal Intellectual Property's search report including the results of a search for the features of the claims included in the U.S. patent application entitled "Storage Device Temperature Sensing", inventors: Brian S. Merrow et al., and having assigned U.S. Appl. No. 12/760,305. The foregoing U.S. patent application is a continuation of U.S. Appl. No. 12/503,687. Revised as of Jan. 7, 2010.

Cardinal Intellectual Property's search report including the results of a search for the features of the claims included in the U.S. patent application entitled "Solid State Temperature Control of Hard Drive Tester", inventors: Brian S. Merrow and having assigned U.S. Appl. No. 12/856,056. The foregoing U.S. patent application is a continuation of U.S. Appl. No. 12/105,103. Revised as of Jan. 14, 2010.

Cardinal Intellectual Property's search report including the results of a search for the features of the claims included in the U.S. patent application entitled "Vibration Isolation Within Disk Drive Testing Sytems", inventors: Brian S. Merrow and having assigned U.S. Appl. No. 12/767,142. The foregoing U.S. patent application is a continuation of U.S. Appl. No. 12/105,105. Revised as of Jan. 12, 2010.

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/766,680. The foregoing U.S. patent application is a continuation of U.S. Appl. No. 11/959,133. Revised as of Jan. 14, 2010.

Cardinal Intellectual Property's search report including the results of a search for the features of the claims included in the U.S. patent application entitled "Chilled Water Temp Control of Disk Drive Tester", inventors: Brian S. Merrow and having assigned U.S. Appl. No. 12/766,680. The foregoing U.S. patent application is a continuation of U.S. Appl. No. 12/105,061. Revised as of Feb. 18, 2010.

Cardinal Intellectual Property's search report including the results of a search for the features of the claims included in the U.S. patent application entitled "Vibration Isolation Within Disk Drive Testing Systems", inventors: Brian S. Merrow and having assigned U.S. Appl. No. 12/767,142. The foregoing U.S. patent application is a continuation of U.S. Appl. No. 12/105,105. Revised as of Mar. 30, 2010.

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/767,113. The foregoing U.S. patent application is a continuation of U.S. Appl. No. 11/959,133. Revised as of Apr. 4, 2010.

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/766,680. The foregoing U.S. patent application is a continuation of U.S. Appl. No. 11/959,133. Revised as of Apr. 1, 2010.

Exhibit 1 in *Xyratex Technology, LTD* v. *Teradyne, Inc.*; Newspaper picture that displays the CSO tester; 1990.

Exhibit 2 in *Xyratex Technology, LTD* v. *Teradyne, Inc.*; Photos of the CSO tester obtained from Hitachi; 1990.

Exhibit 1326 in *Xyratex Technology, LTD* v. *Teradyne, Inc.*; Image of the back of Exhibit 1 and Exhibit 2 photos, which display the photos' dates; 1990.

Exhibit 1314 in *Xyratex Technology, LTD.* v. *Teradyne, Inc.*; Case, "Last products of Disk-File Development at Hursley and Millbrook," IBM, Oct. 12, 1990.

Exhibit 1315 in *Xyratex Technology, LTD.* v. *Teradyne, Inc.*; Case, "History of Disk-File Development at Hursley and Millbrook," IBM, Oct. 17, 1990.

*Xyratex Technology, LTD.* v. *Teradyne, Inc.*, Teradyne, Inc's Prior Art Notice Pursuant to 35 U.S.C. Section 282. Case No. CV 08-04545 SJO (PLAx), Oct. 16, 2009.

*Xyratex Technology, LTD.* v. *Teradyne, Inc.*, Amended Joint Trial Exhibit List of Xyratex and Teradyne. Case No. CV 08-04545 SJO (PLAx), Nov. 12, 2009.

Notification of Transmittal of the International Search Report and the Written Opinion of the International Searching Authority, or the Declaration, for International Application No. PCT/GB2005/003490, Jan. 26, 2006, 10 pages.

Henderson, "HAD High Aerial Densities Require Solid Test Fixtures", Flexstar Technology, Feb. 26, 2007.

FlexStar Technology, 30E/Cascade Users Manual, Doc #98-36387-00 Rev. 1.8, pp. 1-33, Jun. 1, 2004.

Notification Concerning Transmittal of International Preliminary Report on Patentability and Written Opinion of the International Searching Authority from related International Application No. PCT/US2009/039591 dated Oct. 28, 2010.

* cited by examiner

DISK DRIVE EMULATOR AND METHOD OF USE THEREOF

TECHNICAL FIELD

This disclosure relates to disk drive emulators and methods of testing test slots of disk drive testing systems.

BACKGROUND

Disk drive manufacturers typically test manufactured disk drives for compliance with a collection of requirements. Test equipment and techniques exist for testing large numbers of disk drives serially or in parallel. Manufacturers tend to test large numbers of disk drives simultaneously or in batches. Disk drive testing systems typically include one or more racks having multiple test slots that receive disk drives for testing.

The testing environment immediately around the disk drive is closely regulated. Minimum temperature fluctuations in the testing environment are critical for accurate test conditions and for safety of the disk drives. The latest generations of disk drives, which have higher capacities, faster rotational speeds and smaller head clearance, are more sensitive to vibration. Excess vibration can affect the reliability of test results and the integrity of electrical connections. Under test conditions, the drives themselves can propagate vibrations through supporting structures or fixtures to adjacent units. This vibration "cross-talking," together with external sources of vibration, contributes to bump errors, head slap and non-repetitive runout (NRRO), which may result in lower yields and increased manufacturing costs.

Test slots of disk drive testing systems require routine validation and diagnostic testing to insure that the test slots are functioning and performing properly. In general, a "gold drive" is a disk drive that has been independently validated as functioning and performing properly. The gold drive may be used to test the functionality and performance of test slots. Validating and maintaining verification of the gold drive's veracity is cumbersome and expensive. Furthermore, testing data is limited.

SUMMARY

In one aspect, a disk drive emulator for testing a test slot of a disk drive testing system includes an emulator housing, a testing circuit housed in the emulator housing, and an interface connector disposed on the emulator housing and in electrical communication with the testing circuit. The disk drive emulator includes at least one sensor in electrical communication with the testing circuit. The at least one sensor is selected from the group consisting of a temperature sensor, a vibration sensor, and a humidity sensor. The testing circuit is configured to test power delivery of the test slot to the disk drive emulator, monitor the at least one sensor, and monitor connector reliability (e.g. by monitoring connector resistance) between the test slot and the disk drive emulator.

Implementations of this aspect of the disclosure may include one or more of the following features. In some implementations, the emulator housing has a width of about 70 mm and a height of between about 9.5 mm and about 19 mm. The emulator housing is substantially rectangular shaped having top and bottom broad surfaces. A temperature sensor is disposed near each corner of the top and bottom broad surfaces. In some implementations, the emulator housing defines an electronics region, a motor region, and a head region. A temperature sensor is disposed in each region. In some examples, the interface connector comprises a universal asynchronous receiver/transmitter connector. The electrical load element may be a heat source, which in some examples is variable. In one instance, the electrical load element is a motor; however, other heat and/or vibration generating items may be used such as a piezoelectric device, etc.

In some examples, the testing circuit includes a controller in electrical communication with the at least one temperature sensor, the at least one vibration sensor, and the at least one electrical load element. The disk drive emulator may include a humidity sensor in electrical communication with the testing circuit, which is configured to monitor a humidity level of the test slot.

In another aspect, a method of validating a test slot of a disk drive testing system includes establishing electrical communication between a disk drive emulator and the test slot and performing diagnostic testing on the test slot. The diagnostic testing includes testing connectivity between the disk drive emulator and the test slot, testing power delivery from the test slot to the disk drive emulator, monitoring a temperature level of at least one region of the disk drive emulator, and monitoring a vibration level of at least one region of the disk drive emulator.

Implementations of this aspect of the disclosure may include one or more of the following features. In some implementations, performing diagnostic testing on the test slot further includes monitoring a humidity level of the disk drive emulator. In some examples, testing connectivity between the disk drive emulator and the test slot includes testing a universal asynchronous receiver/transmitter connector disposed in the test slot. Testing connectivity between the disk drive emulator and the test slot may include determining a connection resistance between the disk drive emulator and the test slot. In some implementations, testing power delivery from the test slot to the disk drive emulator includes testing a voltage source level of the test slot, testing a current source level of the test slot, and testing a current limiting capacity of the test slot.

In some implementations, monitoring a temperature level of at least one region of the disk drive emulator includes monitoring a temperature level of an electronics region, a motor region, and/or a head region. Monitoring a vibration level of at least one region of the disk drive emulator includes monitoring a vibration level of the head region.

The disk drive emulator, in some examples, includes an emulator housing, a testing circuit housed in the emulator housing, and an interface connector disposed on the emulator housing and in electrical communication with the testing circuit. The disk drive emulator includes at least one sensor in electrical communication with the testing circuit. The at least one sensor is selected from the group consisting of a temperature sensor, a vibration sensor, and a humidity sensor. The testing circuit is configured to test power delivery of the test slot to the disk drive emulator, monitor the at least one sensor, and monitor connector reliability (e.g. by monitoring connector resistance) between the test slot and the disk drive emulator.

The details of one or more implementations of the disclosure are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
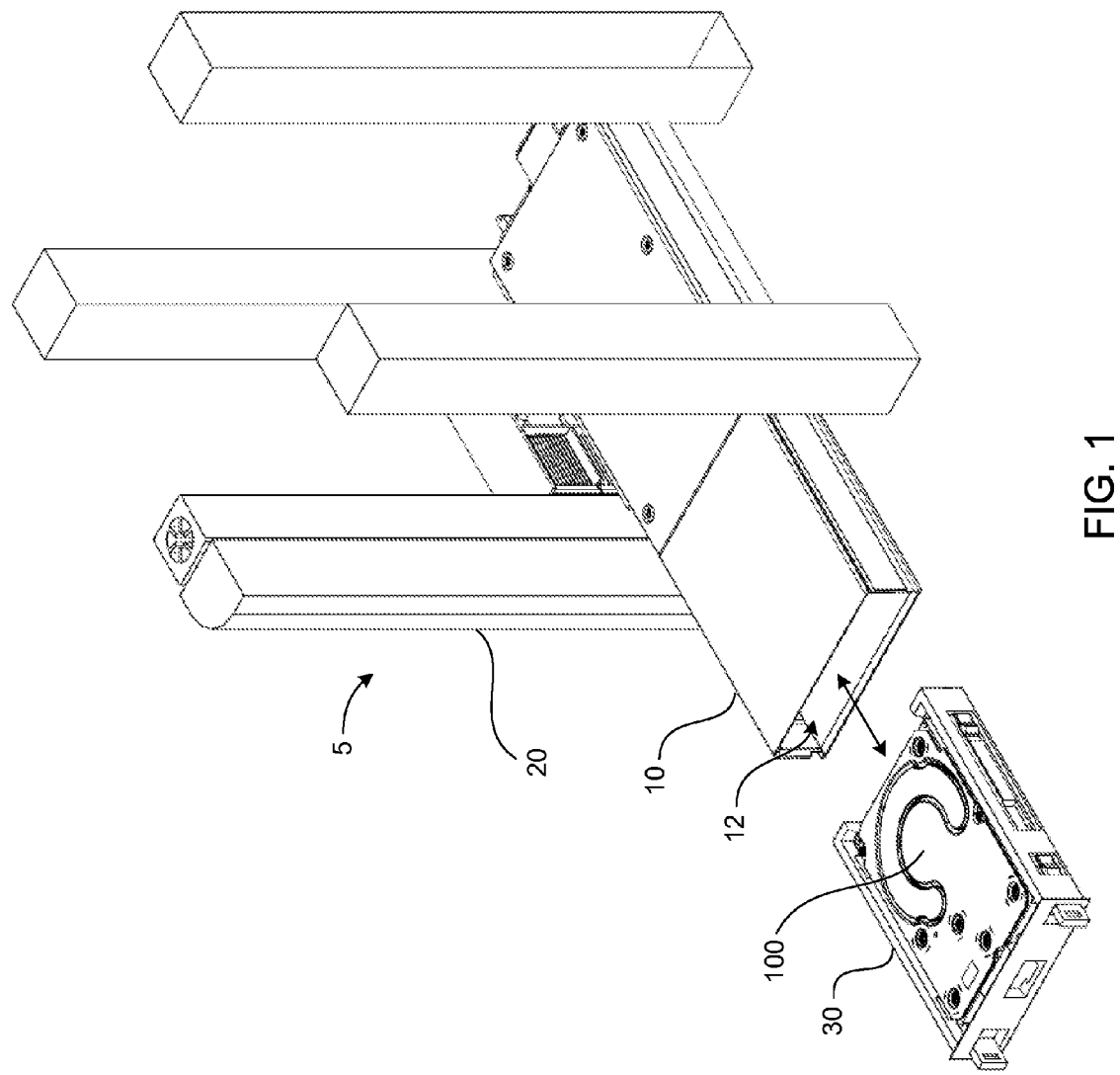
FIG. 1 is a perspective view of a disk drive emulator being inserted into a test slot of a disk drive testing system.
Figure 2:
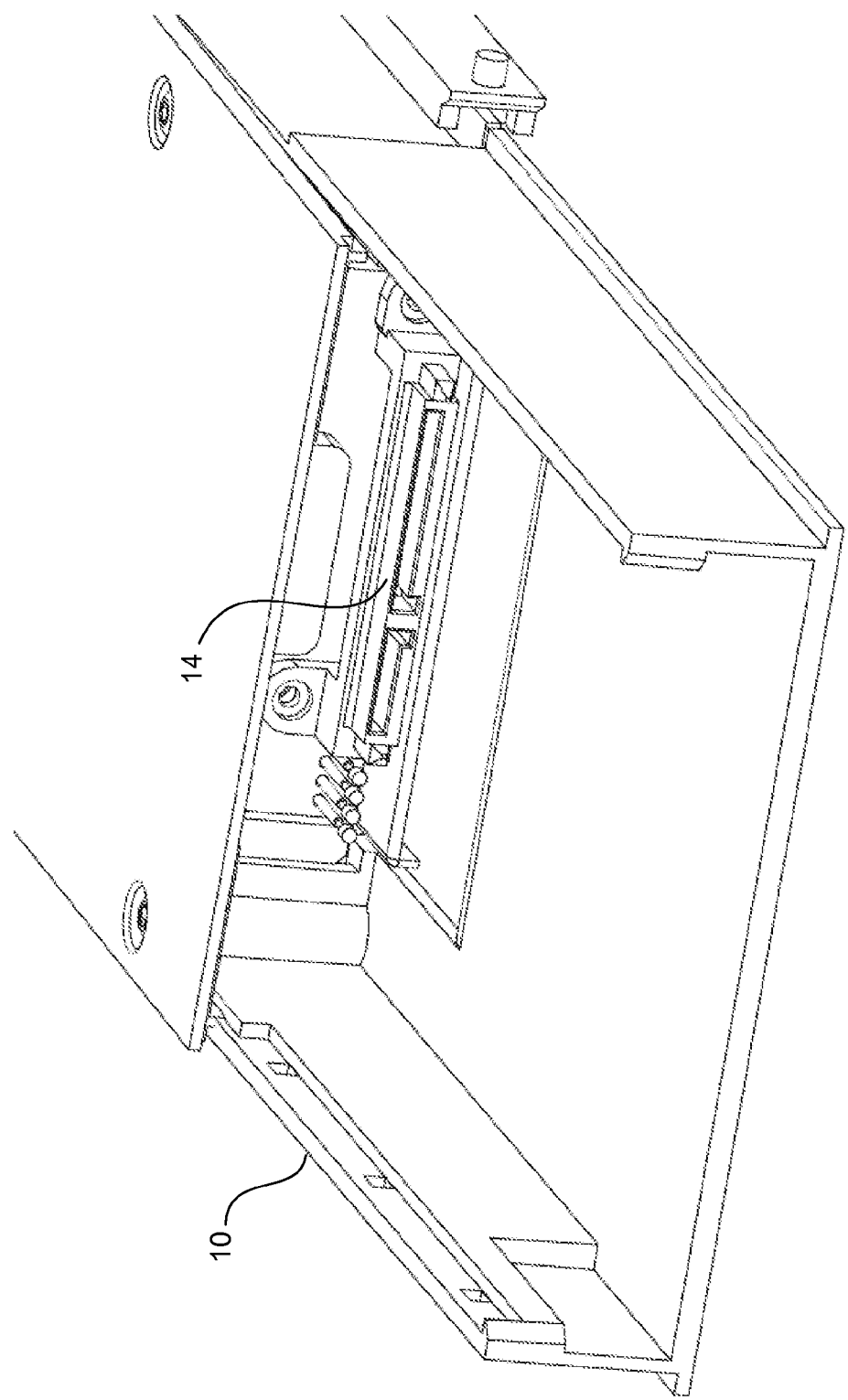
FIG. 2 is a perspective view of a test slot.

A disk drive emulator 100 emulates or simulates an actual disk drive physically (e.g. in size, appearance, amount of radiated heat and/or vibration), but operates as a diagnostics and testing tool for validating test slots 10 of disk drive testing systems 5. In the example shown in FIG. 1, a test slot 10 is mounted to a rack 20. A disk drive transporter 30 carries the disk drive emulator 100, and may be manipulated by a user or a robotic arm for insertion into a receptacle 12 of the test slot 10. The disk drive emulator 100 is placed in a test position engaged with a test slot connector 14, shown in FIG. 2.

Figure 3:
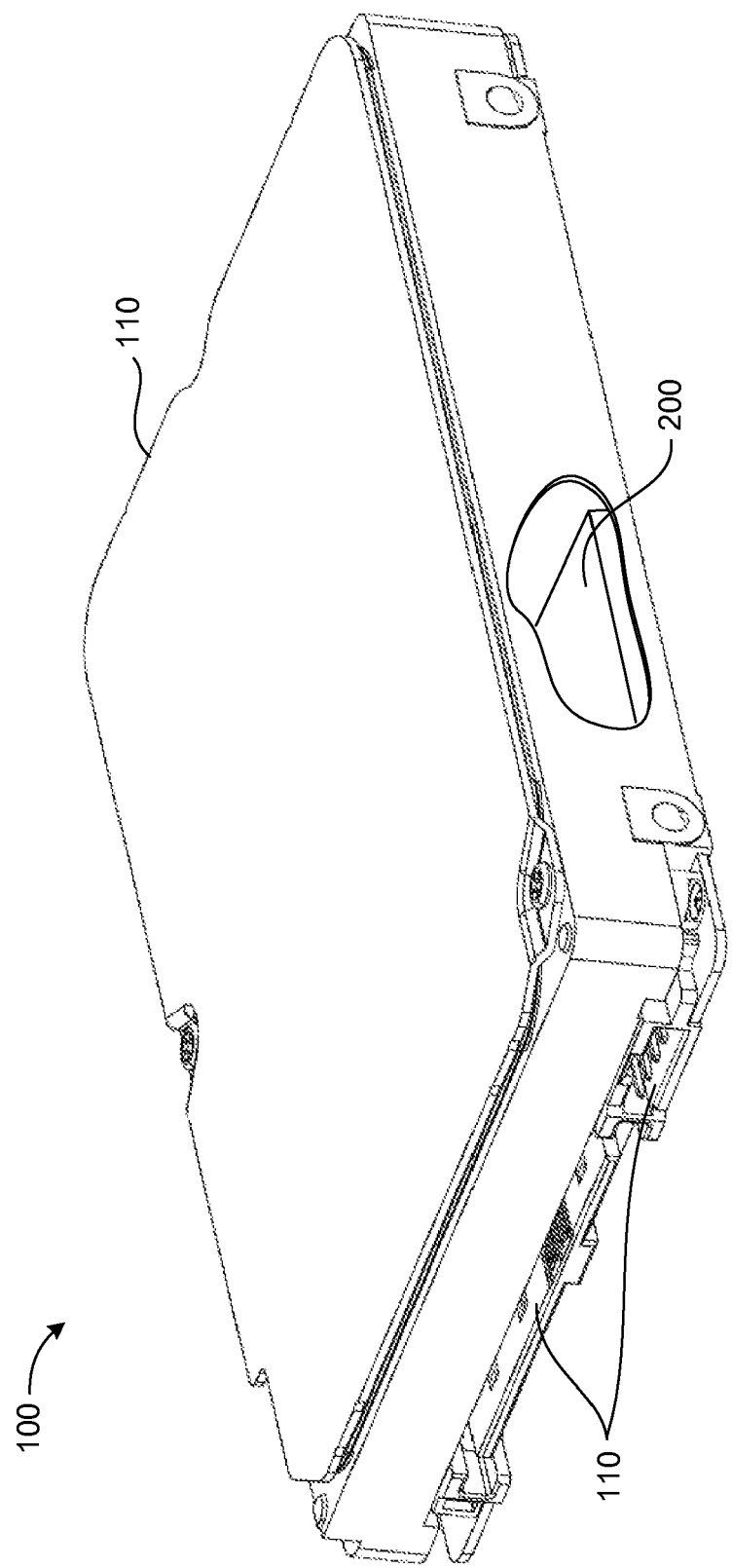
FIG. 3 is a perspective view of a disk drive emulator.

Referring to FIG. 3, the disk drive emulator 100 includes an emulator housing 110, a testing circuit 200 (shown through a cutaway portion of the emulator housing 110) housed in the emulator housing 110, and an interface connector 120 disposed on the emulator housing 110 and in electrical communication with the testing circuit 200. In some implementations, the emulator housing 110 has a width of about 70 mm and a height of between about 9.5 mm and about 19 mm. The interface connector 120 is configured to mate with the test slot connector 14, and may be a universal asynchronous receiver/transmitter connector. The test slot 10 communicates with the disk drive emulator 100 via Parallel AT Attachment (a hard disk interface also known as IDE, ATA, ATAPI, UDMA and PATA), SATA, SAS (Serial Attached SCSI) and/or serial communications. The test slot 10 also supplies power (e.g. +5V and +12V) and ground to the disk drive emulator 100 through the interface connector 120.

The disk drive emulator 100 is configured to validate the test slot 10 and diagnose issues related to the health of the test slot 10. The disk drive emulator 100 tests the power supply and ground of the test slot 10, communications through the test slot connector 14, and an environmental control system of the test slot 10, which regulates temperature, humidity, and vibrations.

Figure 4:
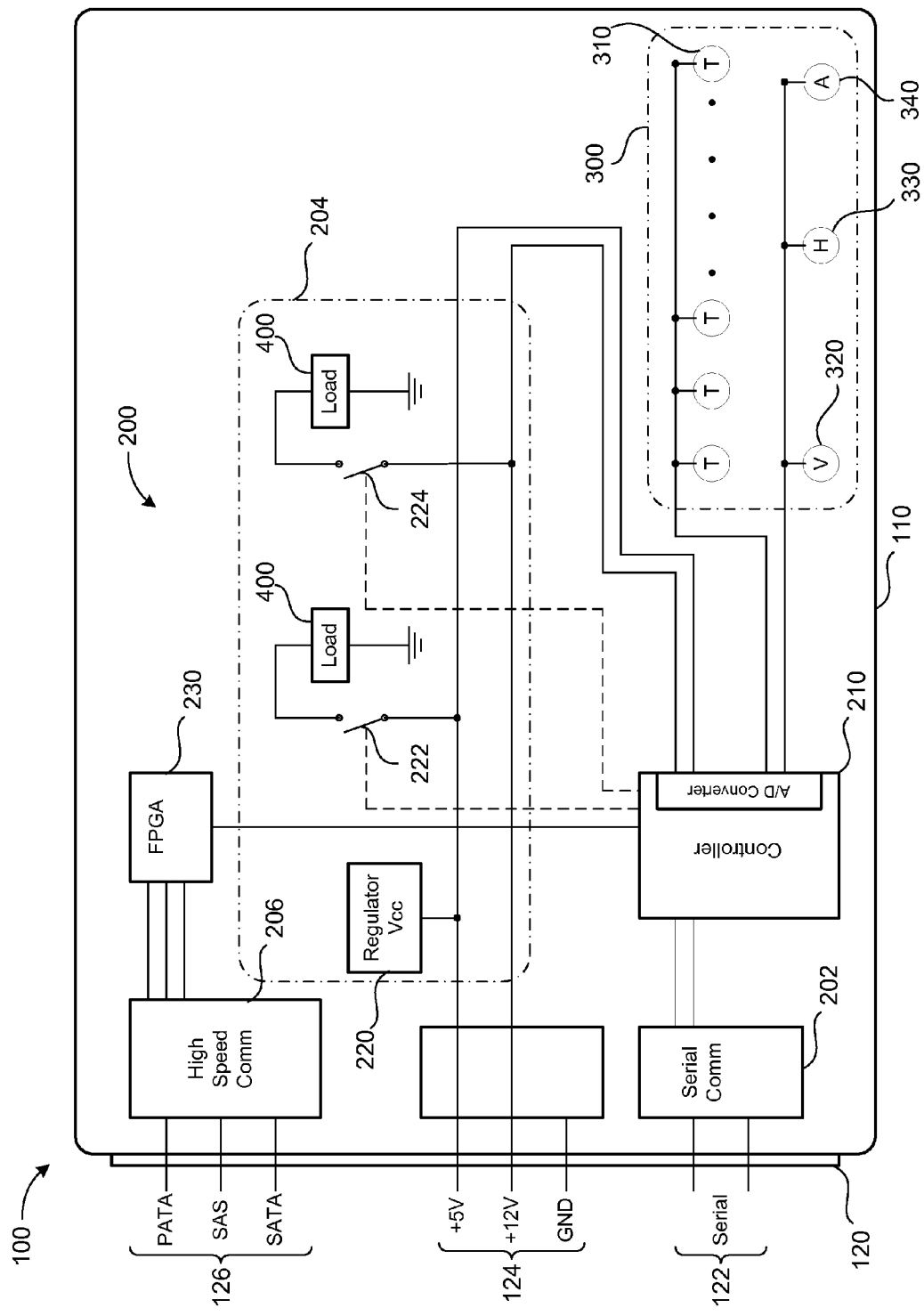
FIG. 4 is a schematic view of a disk drive emulator with a testing circuit.

Referring to the schematic view of the disk drive emulator 100 in FIG. 4, the testing circuit 200 is configured to test power delivery of the test slot 10 to the disk drive emulator 100, temperature and vibration levels of the test slot 10, and connector reliability between the test slot 10 and the disk drive emulator 100 (e.g. by monitoring connector resistance). The testing circuit 200 includes a controller 210 in electrical communication with a serial communications circuit 202, which is in electrical communication with a serial communications portion 122 of the interface connector 120. The controller 210 is in electrical communication with a sensor system 300, which includes at least one temperature sensor 310 and at least one vibration sensor 320. In some examples, the sensor system 300 also includes a humidity sensor 330 in electrical communication with the controller 210 and an air flow sensor 340 to detect and indicate the volume of air being provided to the test slot 10.

Figure 5:
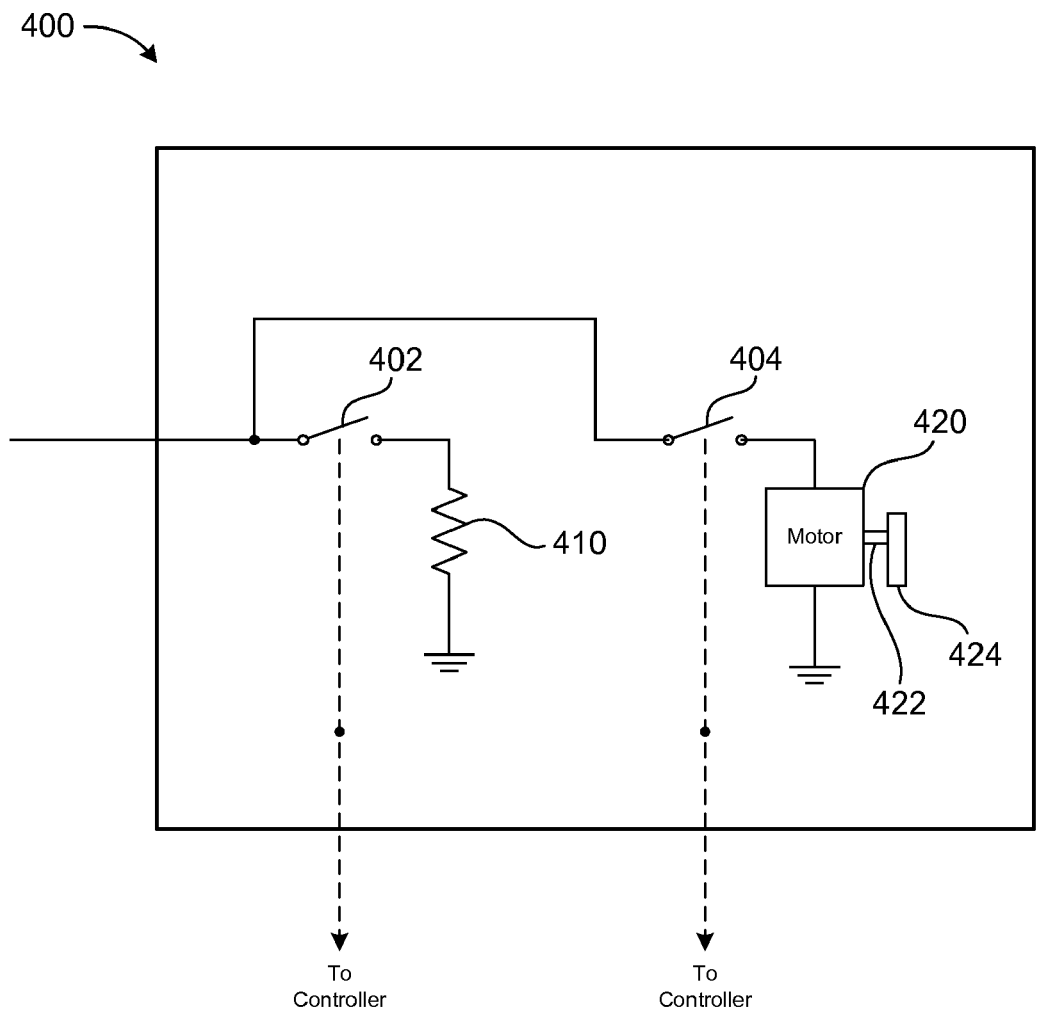
FIG. 5 is a schematic view of a load circuit.

The testing circuit 200 includes a power supply circuit 204 in electrical communication with a power portion 124 of the interface connector 120. The power supply circuit 204 includes a voltage regulator circuit 220 and first and second switches 222, 224, each controlling electrical communication with a respective load circuit 400 and a respective analog-to-digital converter (not shown). The switches 222, 224 are controlled by the controller 210. FIG. 5 provides an example of the load circuit 400 which includes first and second switches 402, 404 that control current delivery to a resistor 410 and a motor 420, respectively. The controller 210 controls operation of the resistor 410 and the motor 420 via their associated switches 402, 404. The load circuits 400 are calibrated for their respective power supply (e.g. +5V or +12V). The load circuits 400 are used to test that an external power source, accessed via power portion 124 of the interface connector 120, is functioning properly. The load circuits 400 or a second set of load circuits (not shown) can be used to trip a circuit breaker of the external power source, so as to test that it is functioning properly.

The disk drive emulator 100 generates heat to simulate heat dissipation of an actual disk drive by activating at least one of the load circuits 400 via its corresponding switch 222, 224 and delivering current to the resistor 410 and/or motor 420, as controlled by their respective switches 402 and 404. The load circuit 400 may be operated to provide constant or variable heat generation. The disk drive emulator 100 generates vibrations to simulate vibration characteristics of an actual disk drive by activating at least one of the load circuits 400 and delivering current to the motor 420 via switch 404. In some examples, the motor 420 includes a cam 424 coupled off-centered to a drive shaft 422 of the motor 420 to generate or accentuate vibrations. The load circuit 400 is positioned in the housing 110 in a location where an actual disk drive typically generates heat and/or vibrations, such as in an electronics region 130, a motor region 140, and/or a head region 150 of the housing 110 (see FIGS. 6-7).

The testing circuit 200 includes a high speed communications circuit 206 in electrical communication with a corresponding high speed communications portion 126 of the interface connector 120 (e.g. PATA, SATA, SAS). The high speed communication circuit 206 is in electrical communication with a field-programmable gate array (FPGA) 230, which is in electrical communication with the controller 210.

Figure 6:
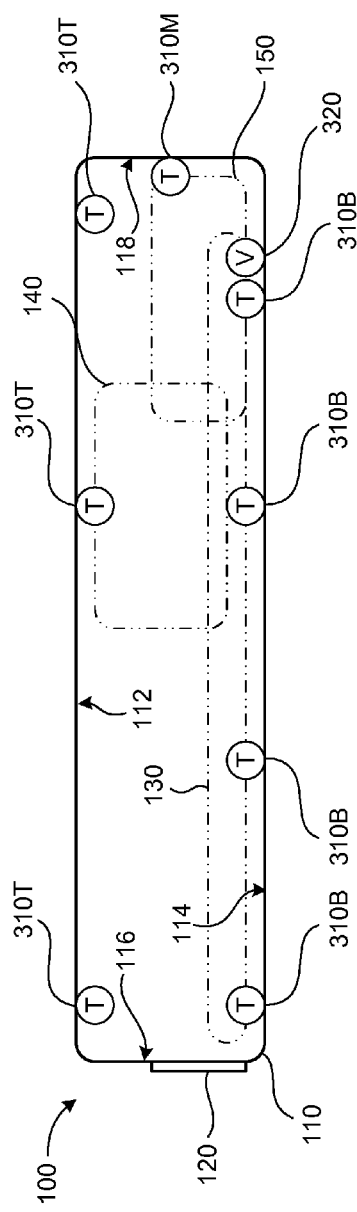
FIG. 6 is a side schematic view of a disk drive emulator housing that illustrates exemplary placement of temperature and vibration sensors within the emulator housing.
Figure 7:
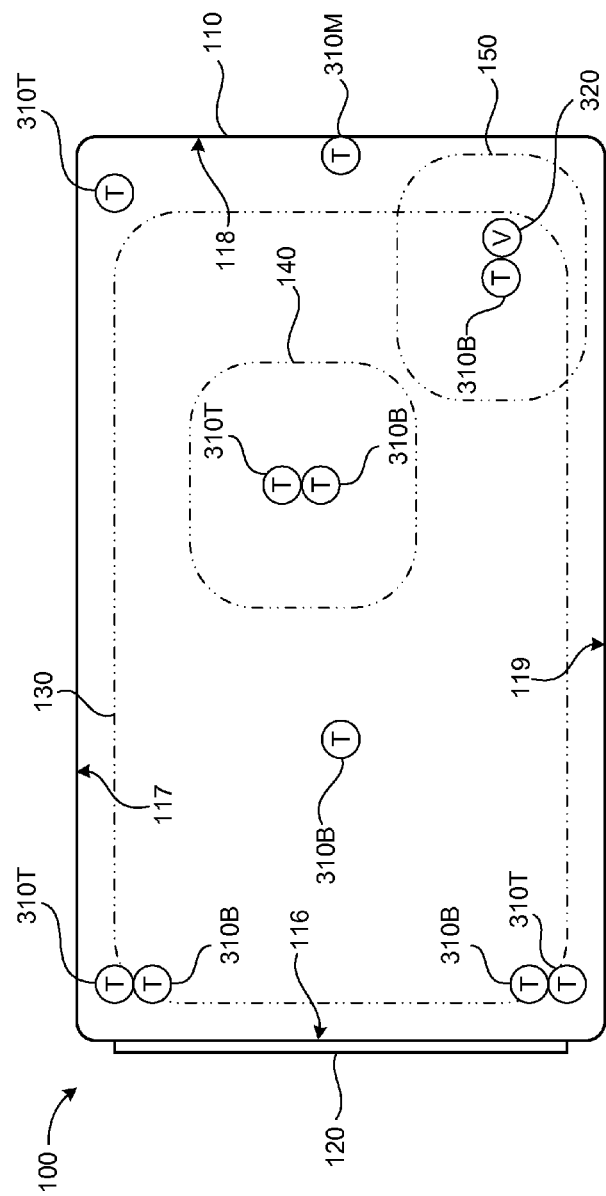
FIG. 7 is a top schematic view of the disk drive emulator housing shown in FIG. 6, illustrating exemplary placement of temperature and vibration sensors within the emulator housing.

The temperature sensors 310 and the vibration sensors 320 are positioned in the housing 110 in a location where an actual disk drive typically generates and experiences heat and vibrations, respectively. In the examples illustrated in FIGS. 6-7, the housing 110 has inside top and bottom surfaces 112, 114, an inside front surface 116 supporting the interface connector 120, an inside back surface 118, and inside left and right side surfaces 117 and 119. FIGS. 6-7 illustrate exemplary placements of the temperature sensors 310 and the vibration sensor 320 inside the housing 110. Two temperature sensors 310T are positioned on the inside top housing surface 112 near each corner adjacent the inside front housing surface 116. Similarly, two temperature sensors 310B are positioned on the inside bottom housing surface 114 near each corner adjacent the inside front housing surface 116. One temperature sensor 310B is positioned on the inside bottom housing surface 114 in the electronics region 130 (e.g. for sensing a temperature of nearby electronics). One temperature sensor 310T is positioned on the inside top housing surface 112 in the motor region 140. One temperature sensor 310B is positioned on the inside bottom housing surface 114 in the head region 150. One temperature sensor 310M is positioned on the inside back side housing surface 118 near the head region 150. One or more temperature sensors 310T may be positioned near corners of the inside top housing surface 112. One or more temperature sensors 310B may be positioned near corners of the inside bottom housing surface 114. A vibration sensor 320 is positioned on the inside bottom housing surface 114 in the head region 150.

A method of validating a test slot 10 of a disk drive testing system 5 includes establishing electrical communication between a disk drive emulator 100 and the test slot 10, and performing diagnostic testing on the test slot 10 (e.g. via the testing circuit 200 of the disk drive emulator 100 described above). The diagnostic testing includes testing connectivity between the disk drive emulator 100 and the test slot 10, testing power delivery from the test slot 10 to the disk drive emulator 100, monitoring a temperature level of at least one region of the disk drive emulator 100, and monitoring a vibration level of at least one region of the disk drive emulator 100. In some implementations, performing diagnostic testing on the test slot 10 also includes monitoring a humidity level of the disk drive emulator 100.

In some implementations, testing connectivity between the disk drive emulator 100 and the test slot 10 includes testing a universal asynchronous receiver/transmitter connector 14 disposed in the test slot 10. In additional implementations, testing connectivity between the disk drive emulator 100 and the test slot 10 includes determining a connection resistance between the disk drive emulator 100 and the test slot 10 (e.g. between the test slot connector 14 and the interface connector 120 of the disk drive emulator 100).

In some examples, testing power delivery from the test slot 10 to the disk drive emulator 100 includes testing a voltage source level, a current source level, and a current limiting capacity of the test slot 10. For example, the connected testing circuit 200 (via the interface connector 120) evaluates and/or monitors the voltage source level, the current source level, and the current limiting capacity of the test slot 10 though power pins of the test slot connector 14 (see FIG. 2).

While performing diagnostic testing on the test slot 10, the method may include monitoring a temperature level of the electronics region 130, the motor region 140, and/or the head region 150. The head region 150 may also be monitored for a vibration level. The testing circuit 200 monitors the temperature and vibration levels, and optionally humidity levels, though the associated temperature sensors 310, vibration sensor(s) 320, and humidity sensor(s) 330 of the sensor system 300.

A number of implementations have been described. Nevertheless, it will be understood that various modifications may be made without departing from the spirit and scope of the disclosure. Accordingly, other implementations are within the scope of the following claims.

What is claimed is:

1. A disk drive emulator for testing a test slot of a disk drive testing system, the disk drive emulator comprising:
   an emulator housing;
   a testing circuit housed in the emulator housing;
   an interface connector disposed on the emulator housing and in electrical communication with the testing circuit;
   at least one sensor in electrical communication with the testing circuit, the at least one sensor selected from the group consisting of a temperature sensor, a vibration sensor, and a humidity sensor; and
   at least one electrical load element in electrical communication with the testing circuit;
   wherein the testing circuit is configured to test power delivery of the test slot to the disk drive emulator, monitor the at least one sensor, and monitor connector reliability between the test slot and the disk drive emulator.

2. The disk drive emulator of claim 1, wherein the emulator housing has a width of about 70 mm and a height of between about 9.5 mm and about 19 mm.

3. The disk drive emulator of claim 1, wherein the emulator housing is substantially rectangular shaped having top and bottom broad surfaces, a temperature sensor being disposed near each corner of the top and bottom broad surfaces.

4. The disk drive emulator of claim 1, wherein the emulator housing defines an electronics region, a motor region, and a head region, a temperature sensor being disposed in each region.

5. The disk drive emulator of claim 1, wherein the interface connector comprises a universal asynchronous receiver/transmitter connector.

6. The disk drive emulator of claim 1, wherein the electrical load element comprises a heat source.

7. The disk drive emulator of claim 6, wherein the heat source is variable.

8. The disk drive emulator of claim 1, wherein the electrical load element comprises a motor.

9. The disk drive emulator of claim 1, wherein the testing circuit comprises a controller in electrical communication with the at least one sensor and the at least one electrical load element.

10. A method of validating a test slot of a disk drive testing system, the method comprising:
    establishing electrical communication between a disk drive emulator and the test slot; and
    performing diagnostic testing on the test slot, the diagnostic testing comprising:
       testing connectivity between the disk drive emulator and the test slot;
       testing power delivery from the test slot to the disk drive emulator;
       monitoring a temperature level of at least one region of the disk drive emulator; and
       monitoring a vibration level of at least one region of the disk drive emulator.

11. The method of claim 10, wherein performing diagnostic testing on the test slot further comprises monitoring a humidity level of the disk drive emulator.

12. The method of claim 10, wherein testing connectivity between the disk drive emulator and the test slot comprises testing a universal asynchronous receiver/transmitter connector disposed in the test slot.

13. The method of claim 10, wherein testing connectivity between the disk drive emulator and the test slot comprises determining a connection resistance between the disk drive emulator and the test slot.

14. The method of claim 10, wherein testing power delivery from the test slot to the disk drive emulator comprises:
    testing a voltage source level of the test slot;
    testing a current source level of the test slot; and
    testing a current limiting capacity of the test slot.

15. The method of claim 10, wherein monitoring a temperature level of at least one region of the disk drive emulator comprises monitoring a temperature level of an electronics region.

16. The method of claim 10, wherein monitoring a temperature level of at least one region of the disk drive emulator comprises monitoring a temperature level of a motor region.

17. The method of claim 10, wherein monitoring a temperature level of at least one region of the disk drive emulator comprises monitoring a temperature level of a head region.

18. The method of claim 10, wherein monitoring a vibration level of at least one region of the disk drive emulator comprises monitoring a vibration level of a head region.

19. The method of claim 10, wherein the disk drive emulator comprises:
- an emulator housing;
- a testing circuit housed in the emulator housing;
- an interface connector disposed on the emulator housing and in electrical communication with the testing circuit, the interface connector being configured to establish electrical communication with the test slot; and
- at least one sensor in electrical communication with the testing circuit, the at least one sensor selected from the group consisting of a temperature sensor, a vibration sensor, and a humidity sensor;
- wherein the testing circuit is configured to test power delivery of the test slot to the disk drive emulator, monitor the at least one sensor, and monitor connector reliability between the test slot and the disk drive emulator.

* * * * *